(12) United States Patent
Kasaba

(10) Patent No.: US 11,783,000 B1
(45) Date of Patent: Oct. 10, 2023

(54) KNOWLEDGE PORTAL FOR EXPLORATION SPACE WITH INTERACTIVE AVATAR

(71) Applicant: KNOW SYSTEMS CORP, Middletown, DE (US)

(72) Inventor: Michael E. Kasaba, Malibu, CA (US)

(73) Assignee: KNOW SYSTEMS CORP., Middletown, DE (US)

( * ) Notice: Subject to any disclaimer, the term of this patent is extended or adjusted under 35 U.S.C. 154(b) by 0 days.

(21) Appl. No.: 18/157,456

(22) Filed: Jan. 20, 2023

(51) Int. Cl.
*G06F 16/954* (2019.01)
*G06T 13/80* (2011.01)
*G06F 16/9532* (2019.01)

(52) U.S. Cl.
CPC ........ *G06F 16/954* (2019.01); *G06F 16/9532* (2019.01); *G06T 13/80* (2013.01)

(58) Field of Classification Search
CPC .................................................... G06F 3/0482
See application file for complete search history.

(56) References Cited

U.S. PATENT DOCUMENTS

| | | | | |
|---|---|---|---|---|
| 2017/0193397 A1* | 7/2017 | Kottha | ..................... | G06F 40/30 |
| 2017/0308792 A1* | 10/2017 | Liang | ..................... | G06Q 10/02 |
| 2019/0294613 A1* | 9/2019 | Sullivan | ................. | G06F 16/254 |
| 2020/0335188 A1* | 10/2020 | Ozeran | ................... | G16H 10/60 |
| 2021/0065569 A1* | 3/2021 | Arvindam | ............... | G06F 40/30 |
| 2021/0201143 A1* | 7/2021 | Choi | ....................... | G06F 40/30 |

* cited by examiner

*Primary Examiner* — Di Xiao

(74) *Attorney, Agent, or Firm* — Plumsea Law Group, LLC

(57) ABSTRACT

A system and method for an interactive knowledge exploration system is described. The example embodiments allow a subject matter guide to create and curate exploration spaces where users can engage in discovery sessions to learn information about a variety of topics. In one embodiment, the method includes receiving data from a subject matter guide for a data collection associated with a first exploration space. The method also includes processing and parsing the received data into a plurality of proposed subjects for the first exploration space, where each proposed subject is associated with a plurality of data blocks. The method further includes receiving edits to the proposed subjects, including edits to one or more groupings of data blocks of the plurality of data blocks for the proposed subjects, and publishing the first exploration space to make the first exploration space available to the users of the interactive knowledge exploration system.

20 Claims, 19 Drawing Sheets

US 11,783,000 B1

KNOWLEDGE PORTAL FOR EXPLORATION SPACE WITH INTERACTIVE AVATAR

BACKGROUND

The present disclosure generally relates to using an artificial intelligence system to provide an interactive avatar, and in particular, to a knowledge portal for exploration spaces where interactive avatars interact with one or more users.

Technology and social media has greatly expanded the ability of people to engage and interact with other people from all over the world through text, audio, and video. However, this expanded audience also causes issues with being able to engage in one-on-one conversations or interactions with people who are particularly knowledgeable in their fields or areas of expertise. For example, researchers, professors, teachers, subject matter experts, specialists, and other persons with advanced knowledge in a particular field may have many millions of followers. It is not practical or feasible in these cases for these persons to be able to interact with so many people on an individualized basis to provide answers to questions or topics within their specialty areas of expertise.

There is a need in the art for a system and method that provides increased access that allows for more individual interactions between people to acquire knowledge.

SUMMARY OF THE INVENTION

A system and method for providing an interactive knowledge exploration system is described herein.

In one aspect, a method of generating an exploration space for a plurality of users of an interactive knowledge exploration system is provided. The method includes receiving data from a subject matter guide for a data collection associated with a first exploration space. The method also includes processing the received data and parsing the received data into a plurality of proposed subjects for the first exploration space. Each proposed subject of the plurality of proposed subjects is associated with a plurality of data blocks associated with the proposed subject. The method further includes receiving edits to one or more of the proposed subjects of the plurality of proposed subjects, including edits to one or more groupings of data blocks of the plurality of data blocks for the plurality of proposed subjects, and publishing the first exploration space to make the first exploration space available to the plurality of users of the interactive knowledge exploration system.

In another aspect, an interactive knowledge exploration system is provided. The system includes an exploration space database including a data collection associated with at least one exploration space. The system also includes a subject matter guide interface allowing communication with a subject matter guide having a data collection stored in the exploration space database. The system further includes a graphic user interface (GUI) rendering module rendering and generating an exploration space from the data collection for the exploration space in the exploration space database. The system also includes an artificial intelligence engine in communication with the exploration space database, the subject matter guide interface, and the GUI rendering module. The artificial intelligence engine includes at least one processor, a memory, and storage for computer-readable instructions that, when executed by the at least one processor, cause the at least one processor to receive data from a subject matter guide for a data collection associated with a first exploration space. The instructions also cause the at least one processor to process the received data and parse the received data into a plurality of proposed subjects for the first exploration space. Each proposed subject of the plurality of proposed subjects is associated with a plurality of data blocks associated with the proposed subject. The instructions further cause the at least one process to receive edits to one or more of the proposed subjects of the plurality of proposed subjects, including edits to one or more groupings of data blocks of the plurality of data blocks for the plurality of proposed subjects, and publish the first exploration space to make the first exploration space available to a plurality of users of the interactive knowledge exploration system.

Other systems, methods, features and advantages of the disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

According to the techniques described herein, a system and method for an interactive knowledge exploration system is provided. The example embodiments allow users to engage in discovery sessions in one or more exploration spaces to learn information about a variety of topics from subject matter guides.

The example embodiments described herein make use of methods and systems employing artificial intelligence (AI). As used herein, "artificial intelligence" may include any known methods or techniques in machine learning and related fields. As examples, artificial intelligence may include systems and methods used in natural language processing (NLP), large language models (LLMs), and similar fields.

Figure 1:
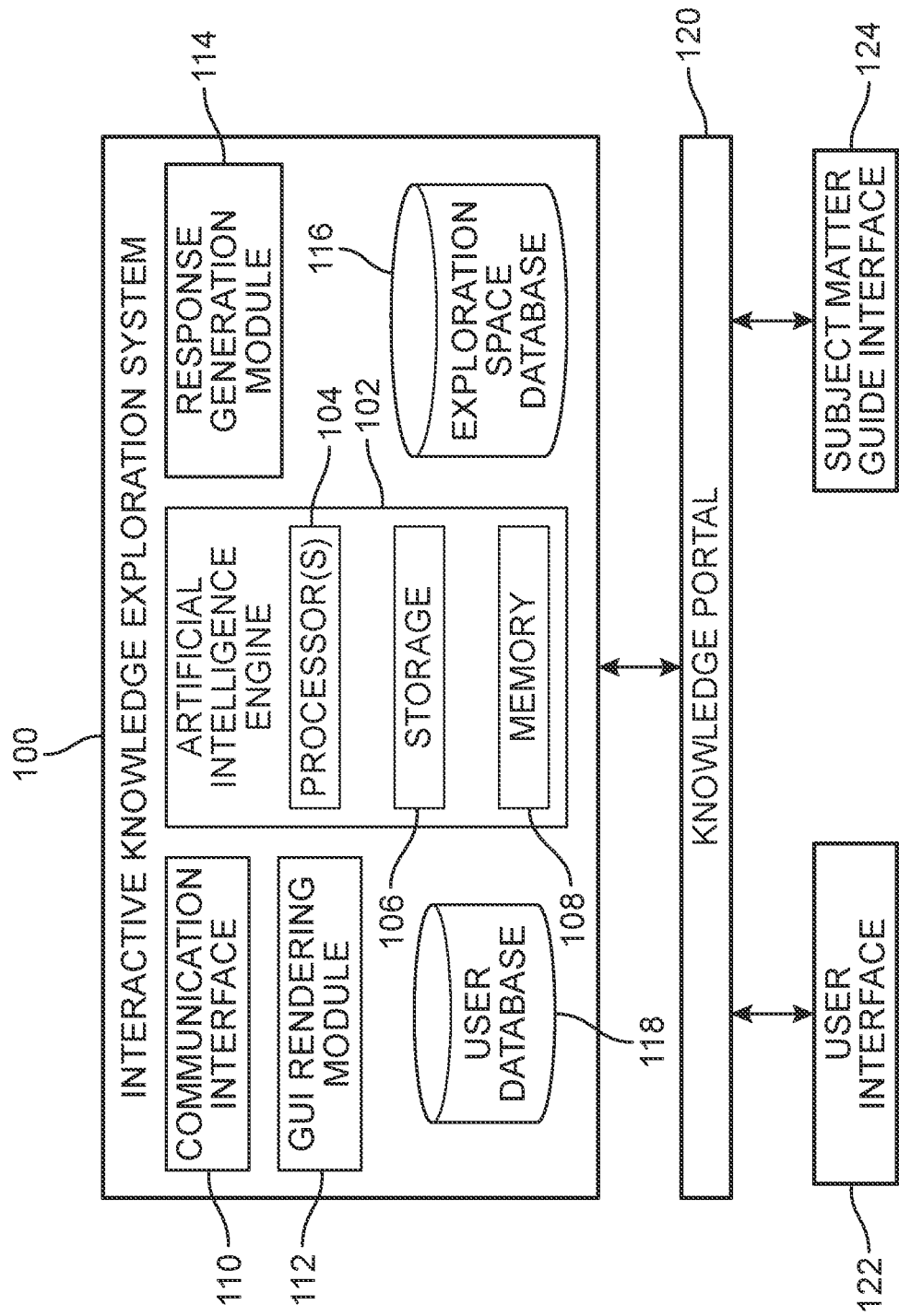
FIG. 1 is a block diagram of an example embodiment of an interactive knowledge exploration system.

FIG. 1 is a block diagram of an example embodiment of an interactive knowledge exploration system 100 (also referred to herein as "system 100") for providing access to one or more exploration spaces created by various subject matter guides. In some embodiments, components of system 100 may be implemented in hardware, software, and/or a combination of hardware and software to execute the functions and operations described herein to provide an interactive digitally rendered avatar. As will be described in more detail below, system 100 uses an artificial intelligence (AI) engine 102 to process and analyze a plurality of data associated with one or more exploration spaces and uses the data to process queries from users, analyze and generate responses to user queries, and render and generate avatars of subject matter guides associated with an exploration space.

In an example embodiment, AI engine 102 may include at least one computer system having a processor configured to execute programs to implement the techniques described herein. The term "computer system" refers to the computing resources of a single computer, the partial computing resources of a single computer, a plurality of computers communicating with one another, a network of remote servers, or other computing devices having at least one processor. In one embodiment, the computer system implementing AI engine 102 includes at least one processor, for example, a processor 104, configured to implement the functions of the interactive knowledge exploration system (e.g., system 100) and/or components of system 100, including functions of the various modules described herein.

AI engine 102 may also include persistent storage 106 and a memory 108. In an example embodiment, storage 106 and memory 108 are computer readable storage media. For example, persistent storage 106 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information. In some embodiments, the media used by storage 106 may also be removable. For example, a removable hard drive may be used for storage 106. Other examples include optical and magnetic disks, thumb drives, and smart cards that are inserted into a drive for transfer onto another computer readable storage medium that is also part of storage 106.

Memory 108 may include random access memory (RAM) and/or cache memory. In general, memory 108 can include any suitable volatile or non-volatile computer readable storage media. Instructions for executing operations of AI engine 102 may be stored in storage 106 and/or memory 108 for execution by processor(s) 104.

One or more programs may be stored in storage 106 for execution by one or more of the respective computer processors 104 via one or more memories of memory 108. For example, the one or more programs may include software instructions that, when executed by the one or more processors 104, cause AI engine 102 to perform the operations of the interactive knowledge exploration system (e.g., system 100) described herein and shown in connection with the accompanying Figures.

Aspects of the example embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

In addition, AI engine 102 may include additional computing system components, such as a bus to provide communication between processor(s) 104, storage 106, and memory 108, as well as other components of system 100, such as a communication interface 110, a graphical user interface (GUI) rendering module 112, a response generation module 114, one or more databases (including an exploration space database 116 and a user database 118), as well as various input/output (I/O) interface(s) that facilitate communication between the various components of system 100.

Communication interface 110 provides for communications with other data processing systems or devices over a communication network. In an example embodiment, communication interface 110 may include one or more network interface cards. Communication interface 110 may provide communications through the use of either or both physical and wireless communications links. In an example embodiment, communication interface 110 may be configured to communicate using multiple types or formats of communication, including, but not limited to broadcast, multicast or other one-to-many communication sessions with a plurality of users, as well as one or more one-on-one communication sessions with individual users, such as two-way communication sessions that include transmitting and/or receiving video, audio, and/or text.

The communication network may be implemented by any number of any type of communications network (e.g., LAN, WAN, Internet, Intranet, VPN, etc.). The computer or other processing systems of the example embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

In an example embodiment, system 100 includes graphical user interface (GUI) rendering module 112. GUI rendering module 112 generates graphics and animations for display to users and/or subject matter guides interacting with system 100 through knowledge portal 120, one or more exploration spaces, and/or other animations and graphics, including icons, images, avatars, logos, banners, and other graphical elements. In some embodiments, GUI rendering module 112 may also generate and render static and/or animated avatars of users or subject matter guides.

For example, an avatar may be a digital representation of a user or subject matter guide, including at least a face/head or a partial or full body of the user or subject matter guide. In some cases, the avatar may be a digital representation that may physically resemble the user or subject matter guide and, in the case of an animated avatar, may be further configured to mimic or emulate the speech, mannerisms, and inflections of the user or subject matter guide. In other cases, the avatar may be an image or animation of any kind to represent the user or subject matter guide, including real or historical persons, fictional or cartoon characters, animals, objects, or any other representation chosen or selected by a user or subject matter guide.

In an example embodiment, the graphics and/or animations rendered and generated by GUI rendering module 112 for system 100 may be output for display through one or more interfaces to interact with one or more users and/or subject matter guides, as will be described in more detail below.

In the example embodiment of FIG. 1, AI engine 102 is in communication with one or more databases, including exploration space database 116 and/or user database 118. Databases 116, 118 may be co-located with AI engine 102 at system 100, may be remote databases that are accessible by AI engine 102 over a communication network, or may be a combination of local and remote databases. Databases 116, 118 may include any kind of storage devices, including but not limited magnetic, optical, magneto-optical, and/or memory, including volatile memory and non-volatile memory.

In one embodiment, exploration space database 116 may include one or more data collections containing information associated with each subject matter guide and their associated exploration spaces that may be accessed by components of system 100 to generate responses to queries from users and render graphics and/or animations, as will be described in detail below in reference to FIG. 3. User database 118 may include data or information associated with one or more users of system 100, as will be described in detail below in reference to FIG. 4.

In some embodiments, GUI rendering module 112 may receive information or data about users and/or subject matter guides from AI engine 102, including information or data about a user stored in user database 118 and/or about a subject matter guide stored in exploration database 116, that allows GUI rendering module 112 to digitally render and generate graphics and animations, including static or interactive avatars of the subject matter guide or user.

In some embodiments, user access to components and functions of interactive knowledge exploration system 100 may be obtained through a knowledge portal 120. In an example embodiment, knowledge portal 120 may be provided as a website or application that acts as an intermediate interface between one or more users and/or subject matter guides accessing interactive knowledge exploration system 100. Knowledge portal 120 may provide information to users and/or subject matter guides about interactive knowledge exploration system 100, allow users and/or subject matter guides to sign up or register with interactive knowledge exploration system 100, and/or may allow users to conduct initial queries or searches to find relevant exploration spaces, as will be further described in detail below.

In other embodiments, user access to components and functions of interactive knowledge exploration system 100 may be integrated into an application or overlay that is configured to be embedded into a website or a video hosted or provided by a third party. For example, in some cases, a direct link or an application programming interface (API) may be integrated into a webpage of a third party website or overlaid onto a video being hosted and played on a third party website or application to allow a person accessing the third party website or application to interact with interactive knowledge exploration system 100 directly through the embedded link or API on the third party website or application.

As described herein, persons interacting with interactive knowledge exploration system 100 may generally include subject matter guides (SMGs) who create, curate, edit, modify, and publish exploration spaces and users or explorers of system 100 who search for and interact with the various exploration spaces of the SMGs included in system 100. It should be understood, however, that a person interacting with system 100 may be both a subject matter guide (e.g., an exploration space creator) as well as a user (e.g., an explorer of the various exploration spaces).

In an example embodiment, separate interfaces are provided for users of system 100 (e.g., explorers of the exploration spaces) and SMGs (e.g., creators of the exploration spaces). For example, as shown in FIG. 1, a user of system 100 may interact with knowledge portal 120 and/or system 100 through a user interface 122 and a SMG of system 100 may interact with knowledge portal 120 and/or system 100 through a subject matter guide interface 124. In some embodiments, functions of user interface 122 and subject matter guide interface 124 may be combined into a single combined user interface that allows a person to interact with knowledge portal 120 and/or system 100 as either or both of a user and/or an SMG.

In different embodiments, user interface 122 may take any one or more of a variety of different forms or devices. In some embodiments, user interface 122 may be embodied in a computer on which the user may engage with system 100. User interface 122 may also be embodied in a mobile device, such as a smartphone or tablet computer, on which the user may engage with system 100. In still another embodiment, user interface 122 may be embodied in a virtual reality (VR) or augmented reality (AR) headset on which the user may engage with system 100. It should be understood that the examples of user interface 122 are not limiting and other devices or forms of user interface 122 may be provided to interact with system 100.

In some embodiments, user interface 122 may include a news feed or similar type of information presentation to the user that provides the user with various information and/or functionalities associated with interactive knowledge exploration system 100. For example, the news feed feature of user interface 122 may list information about recent exploration spaces and/or SMGs visited by user, including the user's progress and/or history, recommendations to the user about other exploration spaces and/or SMGs that may be of interest to the user (i.e., based on the user's history stored in user database 118), alerts for keywords of interest set by the user, SMGs and/or exploration spaces that are being followed by the user, activity of other users that are being followed by the user (e.g., updates on exploration spaces and/or SMGs visited, followed, rated, etc. by the other user), new exploration spaces and/or SMGs available on system 100, and other functions, such as allowing the user to change their avatar or account information. In some embodiments, the news feed of user interface 122 may be the default view that a user is presented with upon interacting with interactive knowledge exploration system 100.

Figure 2:
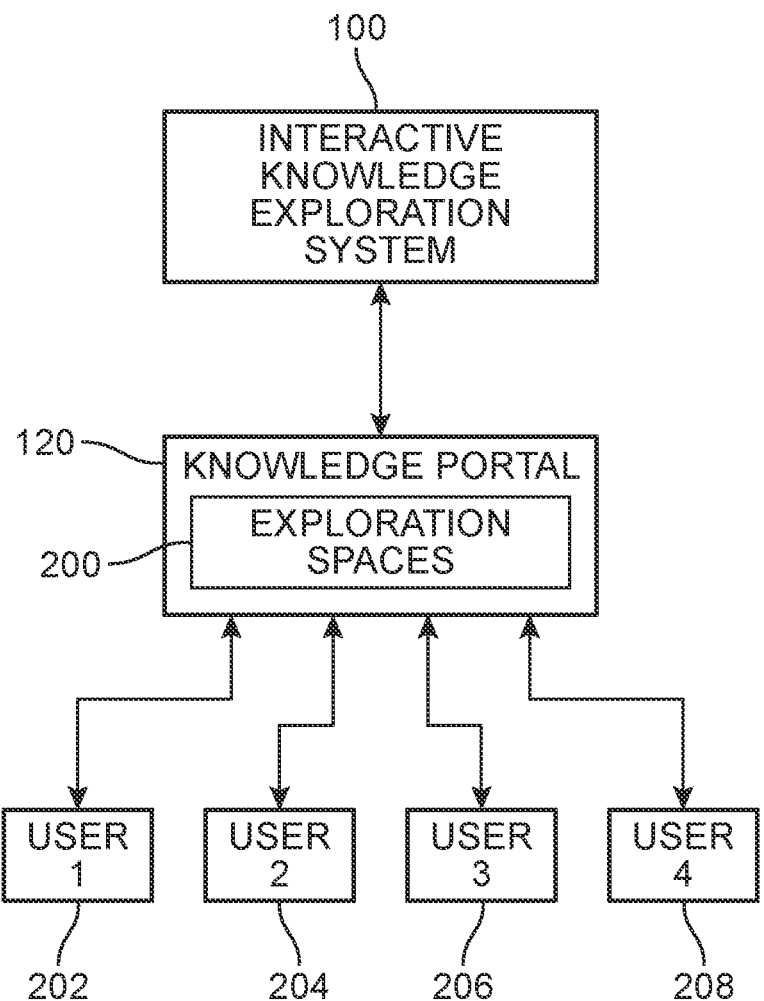
FIG. 2 is a representative view of an example embodiment of a knowledge portal of the interactive knowledge exploration system for aiding users to find exploration spaces.

FIG. 2 is a representative view of an example embodiment of knowledge portal 120 of interactive knowledge exploration system 100 for aiding users to find exploration spaces. In an example embodiment, knowledge portal 120 provides access to interactive knowledge exploration system 100 and allows one or more users to find and interact with exploration spaces 200. As shown in FIG. 2, a plurality of users, including a first user 202, a second user 204, a third user 206, and/or a fourth user 208, may access knowledge portal 120 of system 100 via user interfaces associated with each user (e.g., user interface 122 shown in FIG. 1).

As described above, in some embodiments, knowledge portal 120 may be in the form of a website or an application that allows users 202, 204, 206, 208 to search and find one or more exploration spaces 200. As will be described in more detail below, exploration spaces 200 are created and curated by SMGs to allow users 202, 204, 206, 208 to interact with exploration spaces 200 during discovery sessions to learn about topics and/or subjects of interest. While four representative users (e.g., first user 202, second user 204, third user 206, and fourth user 208) are shown in this embodiment, it should be understood that any number of users may access system 100 through knowledge portal 120.

Figure 3:
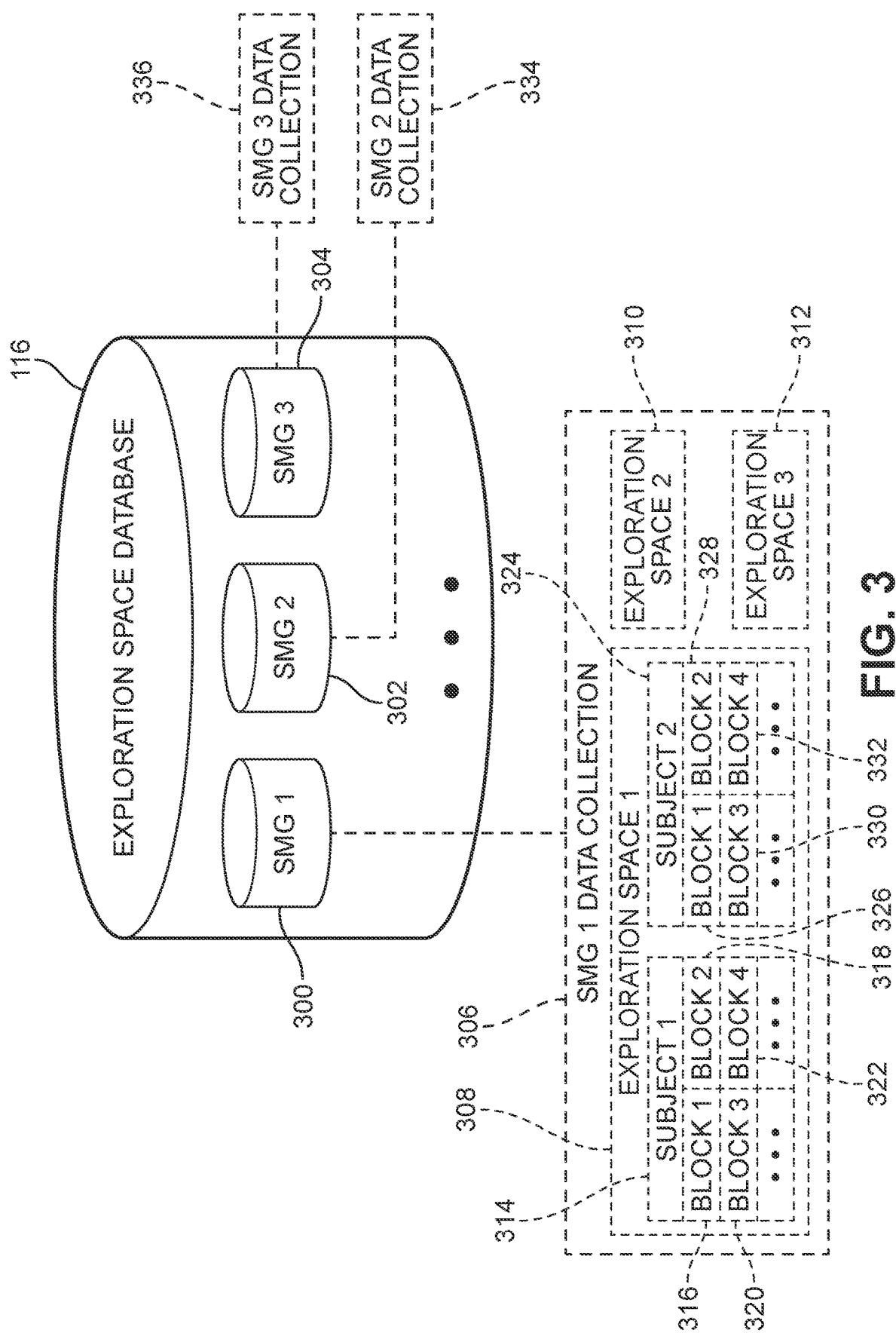
FIG. 3 is a representative view of an example embodiment of an exploration space database.

Referring now to FIG. 3, a representative view of an example embodiment of exploration space database 116 is shown. In some embodiments, exploration space database 116 may include one or more data collections comprising data or information associated with subject matter guides that allows AI engine 102 to process queries from users, analyze and generate responses to user queries, and render and generate avatars of subject matter guides (SMGs) associated with an exploration space for each subject matter guide. In an example embodiment, exploration space database 116 may include a plurality of data collections for one or more SMGs, including a first SMG 300, a second SMG 302, and a third SMG 304. It should be understood that data collections for three SMGs (300, 302, 304) are shown in FIG. 3 for purposes of illustration and exploration space database 116 may include data collections for any number of SMGs.

As shown in FIG. 3, the plurality of data collections stored in exploration space database 116 includes at least a first data collection 306 associated with first SMG 300. In this embodiment, first data collection 306 associated with first SMG 300 is representative of the plurality of data collections stored in exploration space database 116. In an example embodiment, first data collection 306 may include data and information for one or more exploration spaces created and curated by first SMG 300. In this embodiment, first data collection 306 associated with first SMG 300 includes data and information associated with a first exploration space 308, a second exploration space 310, and a third exploration space 312.

A subject matter guide, for example, first SMG 300, may create and curate multiple exploration spaces, where each exploration space focuses on a different subject or topic. The subjects or topics of each exploration space may be similar or related or may be completely different or unrelated. The grouping and scope of an exploration space may be determined by the particular SMG creating and curating that exploration space. For example, some exploration spaces may be wide-ranging (e.g., containing many subjects or topics) and encompass many different areas of interest, whereas other exploration spaces may be narrowly focused (e.g., containing a few subjects or topics) on details of a single or small number of specific areas of interest. In some instances, an exploration space may contain multiple subjects associated with an SMG. In other instances, an exploration space may contain a single subject associated with multiple SMGs. It is also possible that an SMG may be an entity or the representation of a position or role rather than a singular person.

As shown in FIG. 3, first exploration space 308 includes data and information associated with the subjects or topics of first exploration space 308 created and curated by first SMG 300. In an example embodiment, the data and information in each exploration space is grouped or organized into various subjects that each include data or information blocks that relate to that subject. The organization of the subjects and data blocks in each exploration space will be used by AI engine 102 to process queries from users and analyze and generate responses to the user queries. In this embodiment, first exploration space 308 includes a first subject 314 that includes a plurality of data blocks, including a first block 316, a second block 318, a third block 320, and a fourth block 322. First exploration space 308 also includes a second subject 324 that includes a plurality of data blocks, including a first block 326, a second block 328, a third block 330, and a fourth block 332. It should be understood that an exploration space may include a large number of subjects and/or a large number of data or information blocks.

The plurality of data collections stored in exploration space database 116 also includes at least a second data collection 334 associated with second SMG 302 and a third data collection 336 associated with third SMG 304. Exploration space database 116 may include any number of data collections associated with each of the SMGs that create exploration spaces for system 100.

Figure 4:
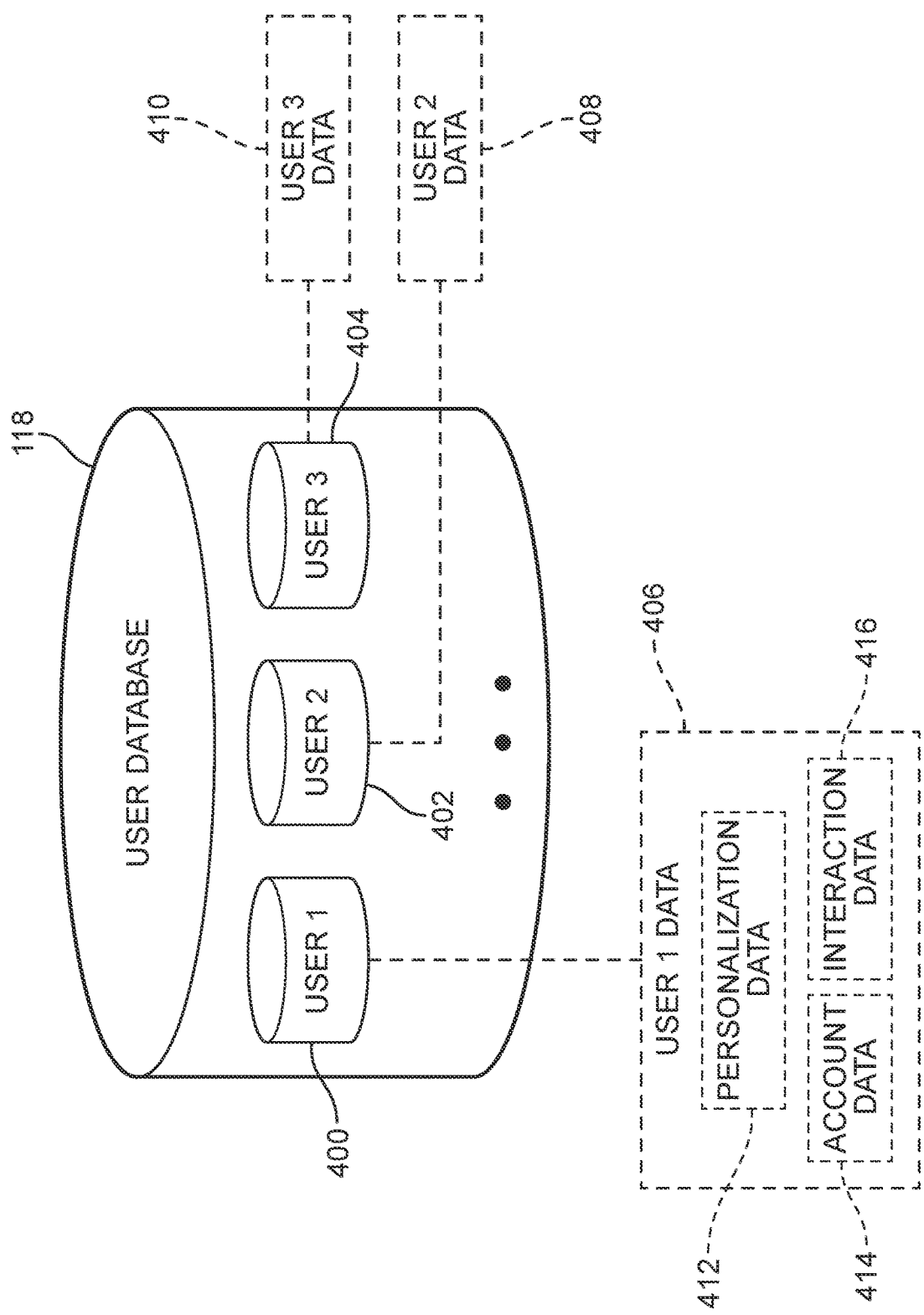
FIG. 4 is a representative view of an example embodiment of a user database.

Referring now to FIG. 4, a representative view of an example embodiment of user database 118 is shown. In some embodiments, system 100 may store information or data associated with one or more users of system 100, including, for example, one or more of first user 202, second user 204, third user 206, and/or fourth user 208 shown in FIG. 2. That is, users may be any person that interacts with one or more of the exploration spaces of system 100. In an example embodiment, user database 118 may include a plurality of user files that contain data sets associated with each user of system 100. In this embodiment, the plurality of user files includes a first user file 400 for first user 202, a second user file 402 for second user 204, and a third user file 404 for third user 206. It should be understood that user files for three users (202, 204, 206) are shown in FIG. 4 for purposes of illustration and user database 118 may include user files for any number of users of system 100.

In this embodiment, a representative user file, for example, first user file 400 that includes a first data set 406 for first user 202, is shown in detail. Each additional user of system 100, including second user 204 and/or third user 206, may also have a data set stored in their respective data file. For example, second user file 402 includes a second data set 408 for second user 204 and third user file 404 includes a third data set 410 for third user 206. In an example embodiment, each data set included in the user files of the plurality of user files (e.g., 400, 402, 404) may include various types of data or information associated with a user of system 100. For example, as shown in FIG. 4, first data set 406 may include personalization data 412, account data 414, and/or interaction data 416 associated with a user (e.g., first user 202).

Personalization data 412 can include various personal data or information associated with first user 202 so that AI engine 102 may use personalization data 412 to customize or personalize the experience of first user 202 during one or more discovery sessions while interacting with any of the exploration spaces of system 100 (e.g., exploration spaces 200 shown in FIG. 2). For example, personalization data 412 may include the user's name, birthday, hair or eye color, names of family members, the user's preferences (e.g., nicknames, topics of conversation, greeting types, favorite subjects, etc.), images or avatars of the user, and other information that can be used by AI engine 102 to personalize or customize interactions between the user and the exploration during a discovery session.

Account data 414 can include account identifiers, such as user names and passwords or account numbers, billing and payment information for the user, including payment types (e.g., credit cards or cryptocurrency), billing addresses, subscription or account plan information, etc. For example, system 100 may bill or charge users on a per transaction basis (i.e., for each interactive discovery session), on a time basis (e.g., on a per minute or other time increment basis), and/or may include various tiers or membership plans that offer varying degrees or amounts of access to exploration spaces and/or SMGs. In some cases, different exploration spaces and/or SMGs may have different fees or rates. In other cases, system 100 may be free to users and may generate revenue through advertising or other types of sponsorships, including endorsements by one or more of the SMGs of system 100.

Interaction data 416 can include various information and data associated with one or more interactive discovery sessions in one or more exploration spaces of any number of SMGs. For example, interaction data 416 may include log files or other captured transcripts of conversations between the user and an avatar of the SMG or the actual SMG, including queries, responses, dates, times, duration of the interaction, topics discussed, feedback provided by the user, ratings of the SMG, ratings of the exploration space, ratings or corrections to subjects and/or responses to the queries, etc. The information or data included in interaction data 416 may be used by system 100 for billing purposes as well as to improve the responses or subjects included in the exploration space. For example, information or data included in interaction data 416 obtained from an interactive discovery session in an exploration space (such as a user completing data blocks and/or subjects or progressing to a new accolade level) may be added to personalization data 412 in first data set 406 for first user 202 to be used by AI engine 102 in subsequent interactive discovery sessions in an exploration space to provide personalized or customized interactions to the user.

The plurality of user files stored in user database 118 may include a similar user file for each user of the plurality of users of system 100. For example, second data set 408 for second user 204 and third data set 410 for third user 206 may include data and information of a similar type and category as the data and information associated with first data set 406, but that is specific to the individual user. That is, each user (first user 202, second user 204, and third user 206) will have a unique data set in their user file stored in user database 118 that includes their own personalization data, account data, and interaction data. By using user database 118 may be used by AI engine 102 of system 100 to ensure that each interactive discovery session conducted by a user in an exploration space is a uniquely personalized and/or customized experience, even when users are interacting with the same exploration space. With this arrangement, because the interactive discovery session uses the user's own data set from their user file, no two interactive discovery sessions will be the same.

Figure 5:
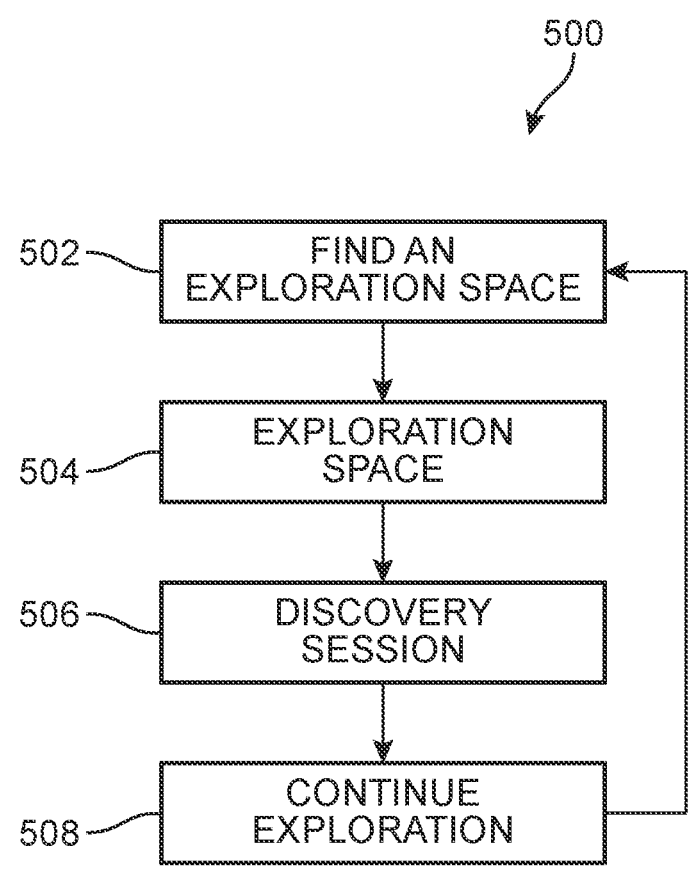
FIG. 5 is a representative flowchart of an example embodiment of a process for navigating an exploration space by a user of the interactive knowledge exploration system.

FIG. 5 is a representative flowchart of an example embodiment of an interactive process 500 for navigating an exploration space by a user of interactive knowledge exploration system 100. In an example embodiment, a user of system 100 may interact with system 100 during process 500 via user interface 122 shown in FIG. 1. In this embodiment, interactive process 500 may begin at an operation 502. At operation 502, a user may find an exploration space of interest about a topic that the user would like to learn more about. For example, operation 502 may include user accessing knowledge portal 120 and initiating one or more initial queries to search for an exploration space.

Once the user has found an exploration space at operation 502, process 500 moves to an operation 504. At operation 504, the user navigates or interacts with a chosen exploration space (e.g., from operation 502). In some cases, at operation 504, a user may select a specific exploration space associated with an SMG that has more than one exploration space. In such cases, the user may select the specific exploration space that the user would like to explore at operation 504. Upon visiting the selected or chosen exploration space, the user may choose to engage in one or more discovery sessions at an operation 506. During a discovery session at operation 506, the user may interact with an avatar of the SMG or, in some cases, the SMG themselves, to present queries about the topics or subjects of the exploration space, review the responses, explore related subjects or topics, and/or review additional or supplemental information associated with a subject or topic, such as reviews, product specifications, videos, or links to other content outside of system 100.

At operation 506, during the discovery session, the user's progress through the various data blocks and/or subjects included in the exploration space may be tracked and indicated, for example, by a progress indicator, that allows the user to visually or graphically perceive their advancement through subject matter of the exploration space. Upon completion of operation 506, the discovery session ends or is terminated. The discovery session at operation 506 may last for any duration of time decided by the user or may be limited to a predetermined amount of time. At the end of operation 506, the user's progress is saved and stored in user database 118 in a user file associated with the user (e.g., stored in first data set 406 of first user file 400 for first user 202).

In some embodiments, process 500 may further include an operation 508 where a user continues exploration of system 100. In some cases, operation 508 may include a user initiating a new discovery session in an exploration space they have previously visited to continue to explore the subjects and topics included in that exploration space. In other cases, operation 508 may include a user initiating a new discovery session in a new exploration space that they have not previously visited, including another exploration space of an SMG having multiple exploration spaces and/or an exploration space of a new SMG that the user has not previously explored. In some embodiments, process 500 may proceed from operation 508 back to operation 502 to assist the user to find a new exploration space, as described above.

Figure 6:
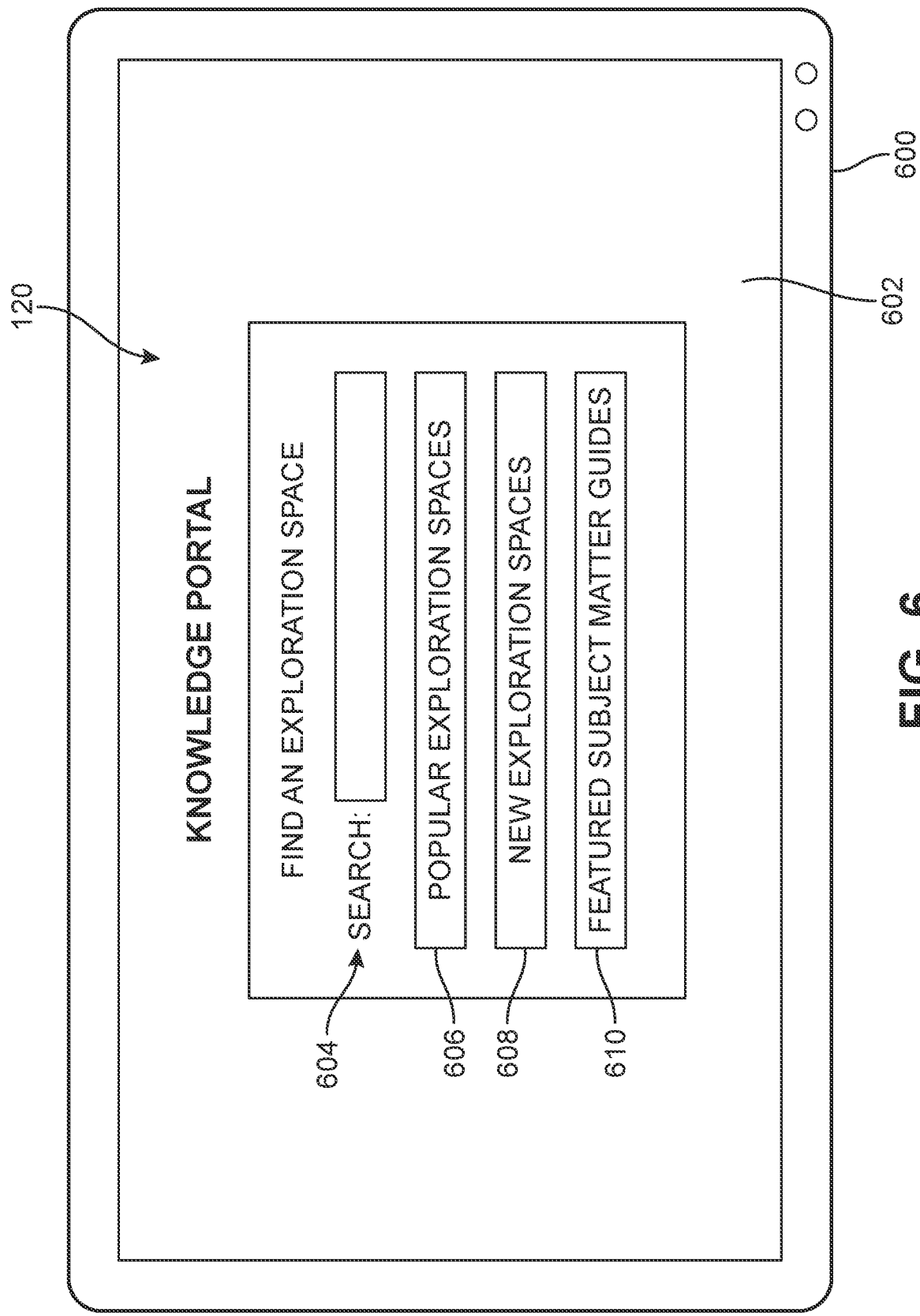
FIG. 6 is a representative view of an example embodiment of a knowledge portal.

Referring now to FIG. 6, a representative view of an example embodiment of knowledge portal 120 is shown. In some embodiments, a user may access knowledge portal 120 via a website or webpage using an internet browser or similar software program or via an application executing on a computing device, such as a smartphone, tablet, or computer. In this embodiment, knowledge portal 120 is graphically presented to a user on a display 602 of a computing device 600. In an example embodiment, knowledge portal 120 graphically presented on display 602 may provide one or more options to a user to discover or find an exploration space. As shown in FIG. 6, a user may conduct a search using a search form 604 to find exploration spaces that match keywords or phrases that relate to a topic or subject that the user would like to explore.

In some embodiments, knowledge portal 120 may also provide one or more prepopulated lists or groups of exploration spaces to the user. In an example embodiment, the prepopulated lists or groups may include a first group of exploration spaces 606 that are popular exploration spaces, for example, as rated or visited by other users of system 100. Knowledge portal 120 may also provide a second group of exploration spaces 608 that are new exploration spaces, for example, exploration spaces that have recently been created or published by one or more SMGs, and a third group of exploration spaces 610 that are associated with one or more featured SMGs. For example, third group of exploration spaces 610 may include exploration spaces of SMGs that are noteworthy, interesting, or featured by system 100 using other criteria, including, in some embodiments, paid sponsorship or advertisement by SMGs to be included as a featured SMG included in third group of exploration spaces 610.

As shown in FIG. 6, knowledge portal 120 includes search form 604 and at least three prepopulated groups of exploration spaces (e.g., first group 606, second group 608, and third group 610) to provide a variety of options for the user to find SMGs and/or exploration spaces on system 100 for the user to explore. In other embodiments, knowledge portal 120 may alternatively or additionally include filters, categories, subject matter keywords or phrases, or other tools or mechanisms that allows a user to find one or more SMGs and/or exploration spaces of interest for the user to explore in more detail.

Figure 7:
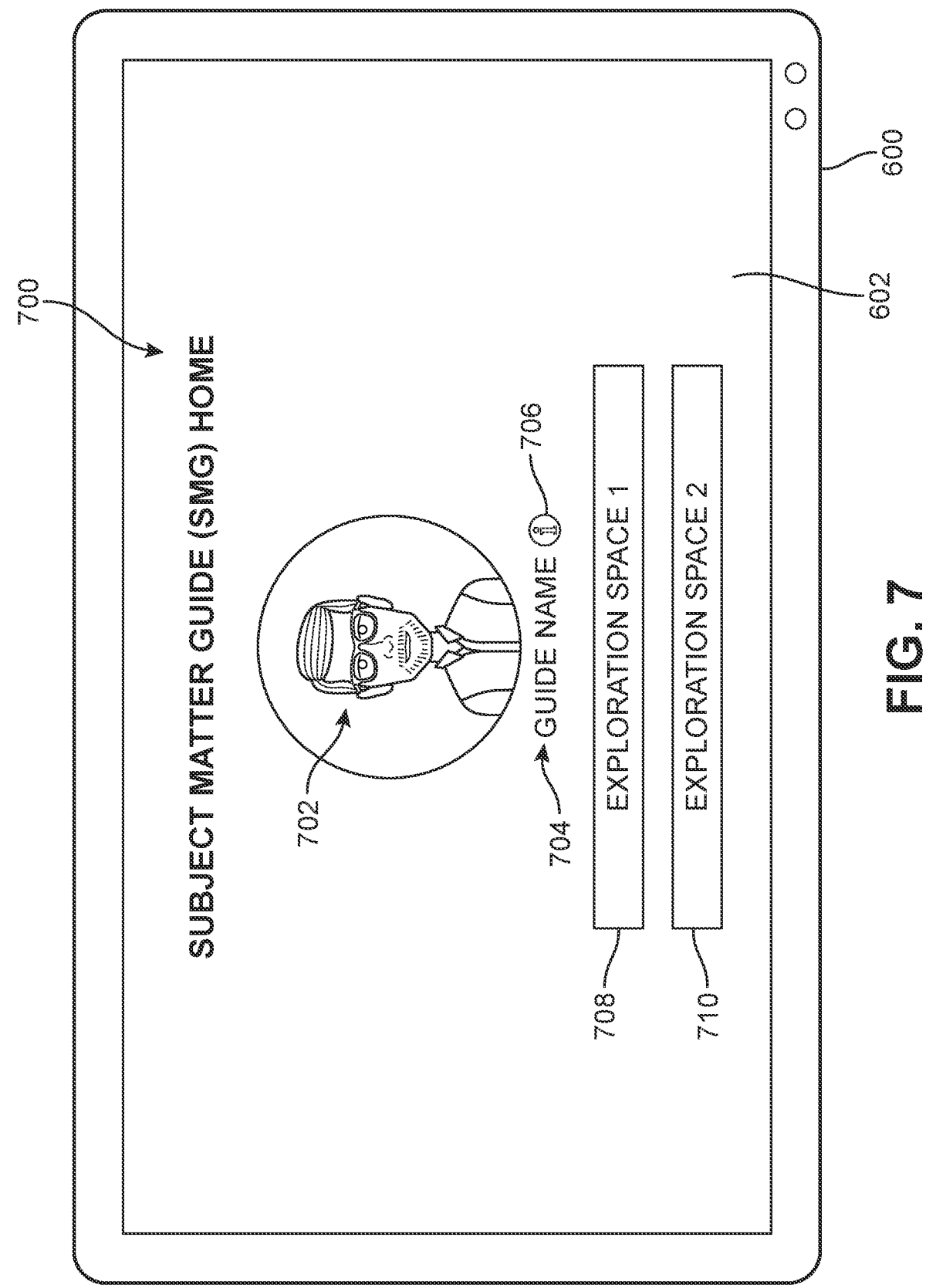
FIG. 7 is a representative view of an example embodiment of a subject matter guide home base.

FIG. 7 is a representative view of an example embodiment of a subject matter guide home base 700. In some embodiments, each SMG that has at least one exploration space included in system 100 may be provided with a home base or landing page that allows a user to learn more about the SMG, including their name, photo or image, and links or connections to the SMG's exploration space(s). As shown in FIG. 7, SMG home base 700 is graphically presented to a user on display 602 of computing device 600. In this embodiment, SMG home base 700 includes a photo or image 702 of the SMG, a name 704 of the SMG, and an information symbol 706 that may be selected using an input device or touchscreen of computing device 600 to display more information about the SMG, such as a biography, resume, list of publications or videos, user ratings or comments, personal statements, and/or any other information that an SMG may choose to provide to allow a user to determine the SMG's experience and/or qualifications on the subjects or topics included in the SMG's exploration space(s).

In some embodiments, an SMG may have one or more exploration spaces dedicated to different topics or areas of interest. As described above, each exploration space may be included in a data collection for the SMG stored in exploration space database 116. As shown in FIG. 7, the SMG home base 700 includes at least a link or connection to a first exploration space 708 and a second exploration space 710. The user may select first exploration space 708 and/or second exploration space 710 using an input device or touchscreen of computing device 600 and system 100 will take the user to the selected exploration space for the user to further explore. While the example embodiment of SMG home base 700 shown in FIG. 7 includes two exploration spaces (e.g., first exploration space 708 and/or second exploration space 710) an SMG's home base may include any number of exploration spaces.

Figure 8:
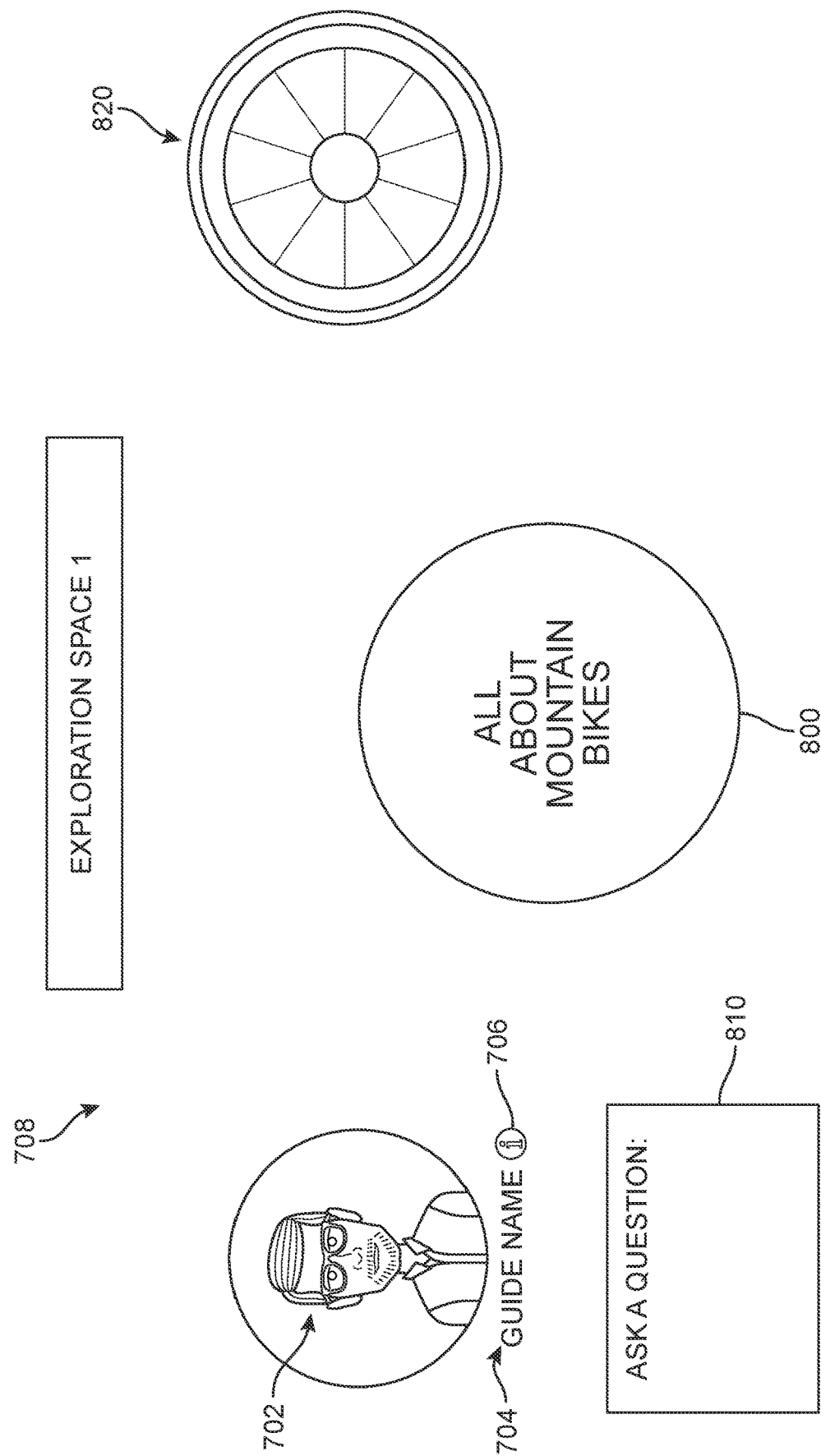
FIG. 8 is a representative view of an example embodiment of an exploration space.

FIG. 8 is a representative view of an example embodiment of an exploration space. In this embodiment, first exploration space 708 is shown in detail. In one embodiment, first exploration space 708 may include some of the information presented to the user from SMG home base 700, including photo or image 702 of the SMG, name 704 of the SMG, and information symbol 706 associated with the SMG. In some embodiments, photo or image 702 of the SMG may be a logo, graphic, or image selected by the SMG, a static (i.e., non-animated) avatar of the SMG or other avatar selected to represent the SMG, an animated avatar of the SMG or other animated avatar selected to the represent the SMG, or may be a live or recorded video of the actual SMG themselves. Additionally, other information that is specific to the selected exploration space (e.g., first exploration space 708) may be presented to the user. In this embodiment, first exploration space 708 includes a response area 800, a query area 810, and a progress indicator 820.

In some embodiments, response area 800 may be a portion or region of first exploration space 708 where responses to queries and other information related specifically to first exploration space 708 are presented to the user. For example, as shown in FIG. 8, before a user has initiated a discovery session within first exploration space 708, response area 800 includes a title or summary of the topic or areas of interest that are to be explored within first exploration space 708. For example, in this embodiment, the title of first exploration space 708 is included in response area 800 (e.g., "All About Mountain Bikes") to indicate to the user what topic or area of interest first exploration space 708 is about. In this case, the SMG who created and curated first exploration space 708 (e.g., SMG name 704) may be an expert or have experience with mountain bikes.

In an example embodiment, response area 800 may be demarcated by an outline or other border to highlight or draw the attention of the user to response area 800 so that the user may quickly and easily find the topic of first exploration space 708 and/or the responses to their queries, as will be described in more detail below. In this embodiment, response area 800 is in the form of a circle that is centrally located within first exploration space 708. However, it should be understood that response area 800 may take other forms, including, but not limited to other shapes or other types of demarcation or borders, and may be located in different portions or regions of first exploration space 708.

Figure 9:
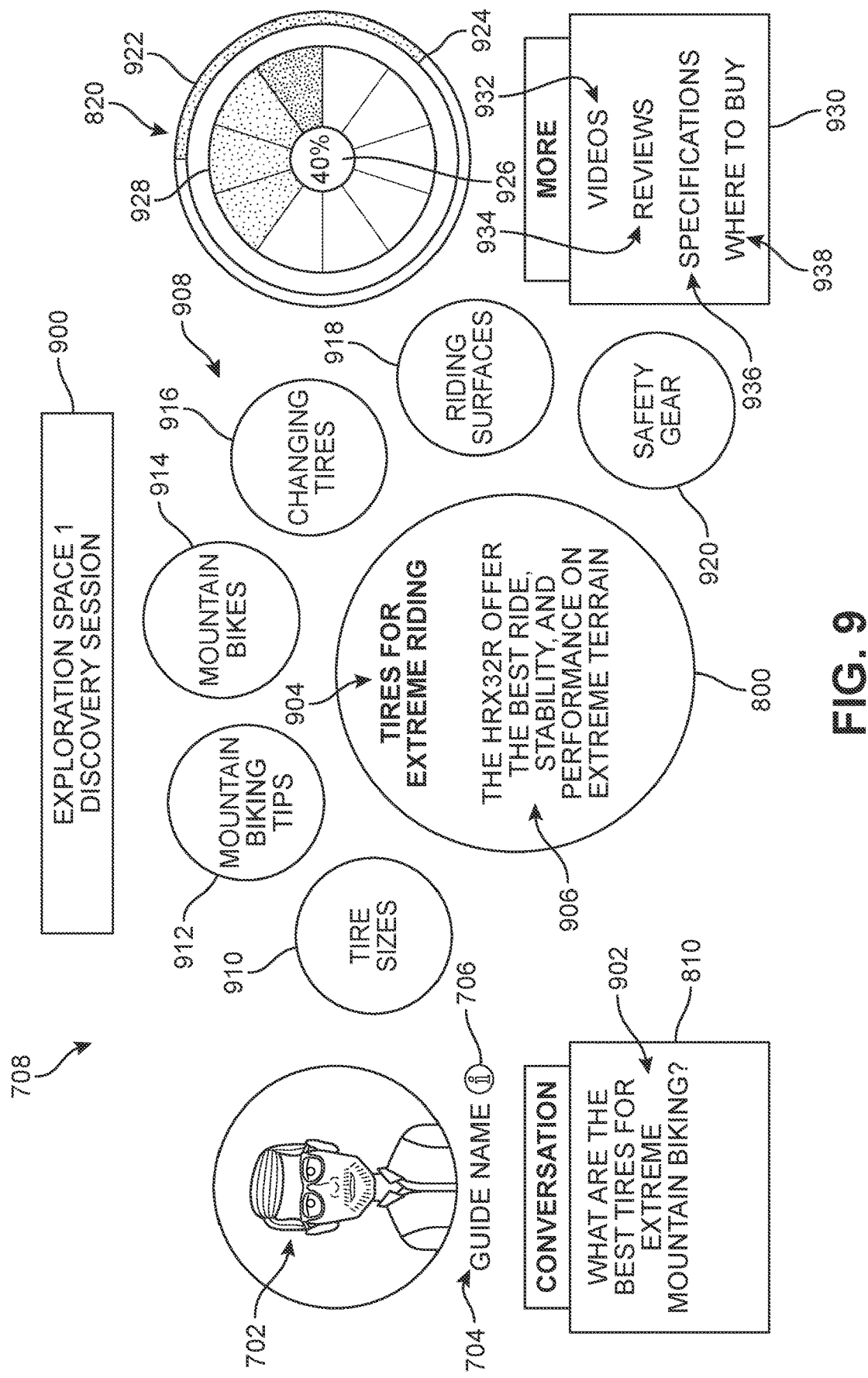
FIG. 9 is a representative view of an example embodiment of a user interacting with an avatar during a discovery session in an exploration space.

In some embodiments, query area 810 may be a portion or region of first exploration space 708 where a user may enter queries or responses to find information related specifically to first exploration space 708. For example, as shown in FIG. 8, before a user has initiated a discovery session within first exploration space 708, query area 810 is blank and waiting for the user to enter an initial query and initiate a discovery session within the exploration space. A user may enter queries into query area using any form of input, including, but not limited to text, voice, and/or video. Once the user enters their initial query into query area 810, a discovery session within first exploration space 708 is started, as shown in FIG. 9. Also shown in FIG. 8 is progress indicator 820 that allows the user to visually or graphically perceive their advancement through the subject matter of first exploration space 708, including one or more subjects and/or data blocks associated with each subject within the exploration space.

Referring now to FIG. 9, a representative view of an example embodiment of a user interacting with an avatar during a discovery session in first exploration space 708 is shown. In some embodiments, a user may initiate a discovery session in an exploration space by entering a query or other request into query area 810. In this embodiment, a user has initiated a first discovery session 900 by entering a query 902 into query area 810 (e.g., "what are the best tires for extreme mountain biking?"). System 100 receives query 902, processes and parses query 902 to determine appropriate responses based on the data collection associated with first exploration space 708 stored in exploration space database 116, and generates a response 904 to query 902. In some embodiments, query 902 may be processed and parsed by system 100 using an NLP algorithm implemented by AI engine 102 and/or response generation module 114 to analyze the content of query 902 to determine an appropriate response (e.g., based on keyword matching, relevancy scores, and/or other techniques).

As shown in FIG. 9, response 904 to query 902 from the user is displayed within response area 800 and includes a subject heading and a detailed answer 906. In an example embodiment, response generation module 114 of system 100 may use one or more subjects and/or data blocks stored in the data collection associated with first exploration space 708 stored in exploration space database 116 to generate response 904 including detailed answer 906.

In an example embodiment, response 904 including detailed answer 906 may be determined based on a relevancy score or other metric that is used by response generation module 114 and/or AI engine 102 of system 100 to determine which response is the best or closest match in response to query 902 from the user. This determined best or closest match is displayed within response area 800 as response 904 with detailed answer 906. Other potentially relevant responses, for example, potential responses to query 902 from the user that have a relevancy score or metric over a predetermined threshold, may be displayed around response area 800.

In some embodiments, the predetermined threshold may be a relevancy score of at least 75% or higher. In other embodiments, the predetermined threshold may be higher or lower. In still other embodiments, the predetermined threshold may be variable and based on the amount of data or information stored in the data collection for the particular exploration space. For example, an exploration space with a larger amount of data or information may have a higher predetermined threshold for relevancy than another exploration space that has a smaller amount of data or information and has a smaller predetermined threshold for relevancy.

In this embodiment, a plurality of potentially relevant responses 908 are shown displayed around an outer perimeter of response area 800. In an example embodiment, plurality of potentially relevant responses 908 are displayed in an approximately circular pattern around the outer perimeter of response area 800. For example, as shown in FIG. 9, plurality of potentially relevant responses 908 include a first potentially relevant response 910, a second potentially relevant response 912, a third potentially relevant response 914, a fourth potentially relevant response 916, a fifth potentially relevant response 918, and a sixth potentially relevant response 920. Additionally, in some embodiments, plurality of potentially relevant responses 908 may be arranged in the circular pattern surrounding response area 800 in an order that represents the relevancy score or other metric of each potentially relevant response.

For example, as shown in FIG. 9, the relevancy (e.g., as measured by the determined relevancy score for each potentially relevant response of plurality of potentially relevant responses 908) is shown in an order that decreases in a clockwise direction around response area 800 such that first potentially relevant response 910 has a higher relevancy score than second potentially relevant response 912, which has a higher relevancy score than third potentially relevant response 914, which has a higher relevancy score than fourth potentially relevant response 916, which has a higher relevancy score than fifth potentially relevant response 918, which has a higher relevancy score than sixth potentially relevant response 920. With this arrangement, the relevancy of a potentially relevant response to query 902 from the user may be graphically arranged around response area 800 in a manner that visually indicates to the user how relevant each potentially relevant response is to query 902.

In an example embodiment, each potentially relevant response of plurality of potentially relevant responses 908 arranged around response area 800 includes only a subject heading related to the potentially relevant response. If the user selects one of plurality of potentially relevant responses 908, that selected potentially relevant response may be moved to response area 800 and a detailed answer associated with that selected potentially relevant response may be shown in response area 800. With this arrangement, the graphical presentation of the responses during first discovery session 900 may automatically be rearranged in response to the user's selection of one of plurality of potentially relevant responses 908 so that the selected response is always shown in response area 800.

In this embodiment, response area 800 is displayed to the user as a circular or round shape with an outer perimeter and plurality of potentially relevant responses 908 are also displayed to the user in a substantially circular or round pattern surrounding response area 800. In other embodiments, response area 800 may have different shapes and/or plurality of potentially relevant responses 908 may be graphically presented to the user in a different manner that indicates the relevancy of each potentially relevant response. For example, in one embodiment, the response area may be in the form of a box or linear feed that displays the determined response and the plurality of potentially relevant responses in a descending order of relevancy (i.e., based on the relevancy score) from top to bottom of the response area. In this manner, the relevancy of the potentially relevant responses may be visually indicated to the user.

In some embodiments, a user may visually or graphically perceive their advancement through the subject matter of an exploration space, for example, first exploration space 708, including one or more subjects and/or data blocks associated with each subject within the exploration space using progress indicator 820. In an example embodiment, progress indicator 820 may include an outer completion ring 922, a numerical completion indicator 926, and a subject slice gauge 928. In some embodiments, progress indicator 820 may visually indicate to the user overall completion of the exploration space using a pointer 924 at a location on outer completion ring 922 that corresponds to the relative completion of all subjects in the exploration space. A numerical percentage of the relative completion of all subjects in the exploration space may be shown using numerical completion indicator 926 (e.g., 40% completion of first exploration space 708 as shown on progress indicator 820 in FIG. 9). Additionally, completion or progress through each subject of the one or more subjects of the exploration space may be indicated by subject slice gauge 928. Further details of progress indicator 820 will be described with reference to FIG. 11.

In some embodiments, an exploration space, such as first exploration space 708 shown in FIG. 9, may also include a supplemental information box 930. In an example embodiment, supplemental information box 930 may be used to provide additional or supplemental information that is related or connected to a given response, but which is not included in response area 800. In some cases, supplemental information box 930 may be used to provide references or sources used by system 100 to generate response 904 to query 902. In this embodiment, response 904 with detailed answer 906 to user query 902 shown in response area 800 may further be associated with additional or supplemental information included in supplemental information box 930.

For example, as shown in FIG. 9, supplemental information box 930 includes a link or connection to videos 932, reviews 934, specifications 936, and/or locations to buy 938 the product that is discussed in detailed answer 906 of response area 800. That is, detailed answer 906 identifies a product (e.g., HRX32R tire) and supplemental information box 930 provides the user with more details or information about that product, including videos 932 of the product, reviews 934 of the product, specifications 936 of the product, and locations of where to buy 938 the product. With this arrangement, a user may explore supplemental information box 930 to seek out additional or supplemental information about a given response (e.g., response 904 with detailed answer 906). In some cases, the additional or supplemental information included in supplemental information box 930 may be stored in the data collection for the exploration space in exploration space database 116 of system 100. In other cases, the additional or supplemental information included in supplemental information box 930 may be retrieved or provided by third party servers or databases. In still other cases, the additional or supplemental information included in supplemental information box 930 may be a combination of stored data or information from exploration space database 116 of system 100 and third party servers or databases.

FIG. 9 illustrates a first arrangement of responses to query 902 from the user during first discovery session 900 with response 904 and detailed answer 906 shown in response area 800 and plurality of potentially relevant responses 908 arranged around response area 800 in an order that represents a descending relevancy score for query 902. In some embodiments, when a user submits a new query or comment during first discovery session 900, system 100 may automatically change and rearrange responses and/or potentially relevant responses shown to the user in first exploration space 708 to a new arrangement of responses to the new query that reflects the new relevancy scores for that new query.

Figure 10:
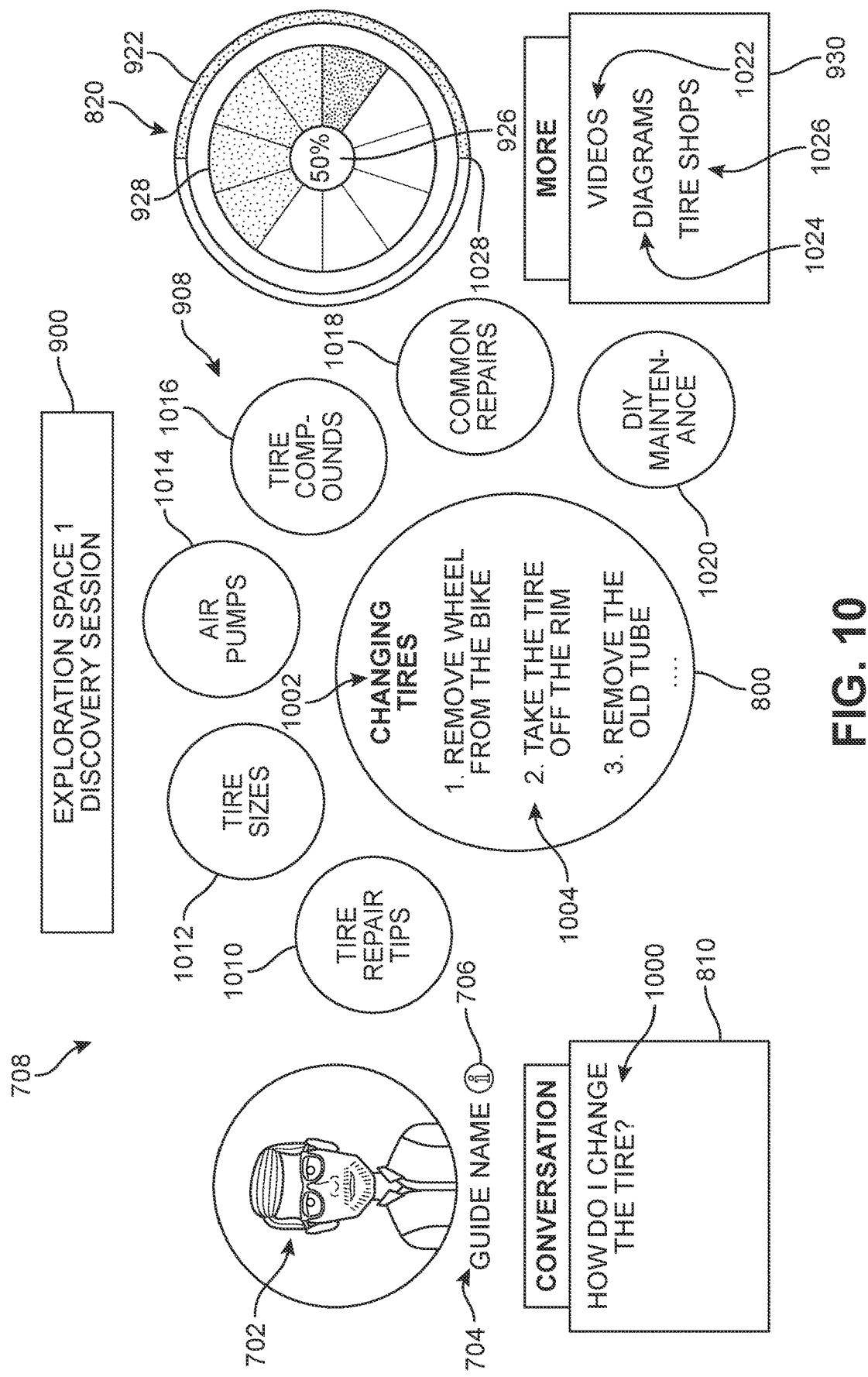
FIG. 10 is a representative view of a rearrangement of subjects in an exploration space based on a user query.

Referring now to FIG. 10, a representative view of a rearrangement of subjects in first exploration space 708 is shown based on a user query. In this embodiment, the user is continuing first discovery session 900 in first exploration space 708. The user has now entered a new query 1000 into query area 810 (i.e., query 1000 is a different query than query 902 from FIG. 9). In some cases, new query 1000 may be related to the original query 902 (e.g., "How do I change a tire" as shown in FIG. 10). In other cases, new query 1000 may be a new question about a subject to be explored in first exploration space 708 that is unrelated to the original query 902.

In response to new query 1000, system 1000 automatically rearranges and reconfigures the responses that are presented to the user based on relevancy scores or other metrics that are used by response generation module 114 and/or AI engine 102 of system 100 to determine which response is the best or closest match in response to new query 1000 from the user. This determined best or closest match is displayed within response area 800 as response 1002 with detailed answer 1004. A plurality of potentially relevant responses 1008 to new query 1000 from the user that have a relevancy score or metric over a predetermined threshold, may be displayed around response area 800 with an order based on the relative relevancy score of each potentially relevant response, as described above.

In this embodiment, plurality of potentially relevant responses 1008 are shown displayed in an approximately circular pattern around an outer perimeter of response area 800. For example, as shown in FIG. 10, plurality of potentially relevant responses 1008 include a first potentially relevant response 1010, a second potentially relevant response 1012, a third potentially relevant response 1014, a fourth potentially relevant response 1016, a fifth potentially relevant response 1018, and a sixth potentially relevant response 1020. Additionally, in some embodiments, plurality of potentially relevant responses 1008 may be arranged in the circular pattern surrounding response area 800 in an order that represents the relevancy score or other metric of each potentially relevant response.

As shown in FIG. 10, plurality of potentially relevant responses 1008 is different from plurality of potentially relevant responses 908 shown in FIG. 9. That is, plurality of potentially relevant responses 1008 are changed based on the determined relevancy to new query 1000, as determined by response generation module 114 and/or AI engine 102 of system 100. Additionally, system 100 also automatically changes and updates other information shown to the user during first discovery session 900 in first exploration space 708 in response to new query 1000.

For example, as shown in FIG. 10, supplemental information box 930 includes a link or connection to videos 1022, diagrams 1024, and/or tire shops 1026 based on what is discussed in detailed answer 1004 of response area 800. That is, detailed answer 1004 identifies a process for changing a tire and supplemental information box 930 provides the user with more details or information about that process, including videos 1022 of the process for changing a tire, diagrams 1024 showing how to change a tire, and stores or locations 1026 of where to buy or have a tire changed. With this arrangement, the additional or supplemental information included in supplemental information box 930 is automatically reconfigured by system 100 in real time in response to a given response to a new query from the user (e.g., response 1002 with detailed answer 1004 to new query 1000).

In addition, as the user continues to make new queries, comments, or explores responses and/or potentially relevant responses during first discovery session 900, progress indicator 820 automatically updates and reconfigures to indicate the additional progress made by the user through the subjects or blocks of information included in first exploration space 708. In this embodiment, pointer 1028 is at a new location along outer completion ring 922 that corresponds to the completion of new subjects in first exploration space 708 (e.g., responses to new query 1000). Similarly, numerical completion indicator 926 is also automatically updated and reconfigured to indicate the new progress made by the user (e.g., 50% completion of first exploration space 708 as shown on progress indicator 820 in FIG. 10) and completion or progress through each subject of the one or more subjects of first exploration space 708 may be indicated by subject slice gauge 928.

Thus, during first discovery session 900, system 100 automatically recalculates and rearranges responses to new queries from the user shown in first exploration space from, for example, the first arrangement of responses to query 902 shown in FIG. 9 to a second arrangement of responses to new query 1000 from the user with response 1002 and detailed answer 1004 shown in response area 800 and plurality of potentially relevant responses 1008 arranged around response area 800 in an order that represents a descending relevancy score for new query 1000. With this configuration, system 100 may continue to provide the user with the most relevant responses in a location on the user's display that is consistent from one query to the next, so that the user may reliably seek out the best or most relevant response to their query by checking the same location in the exploration space.

Figure 11:
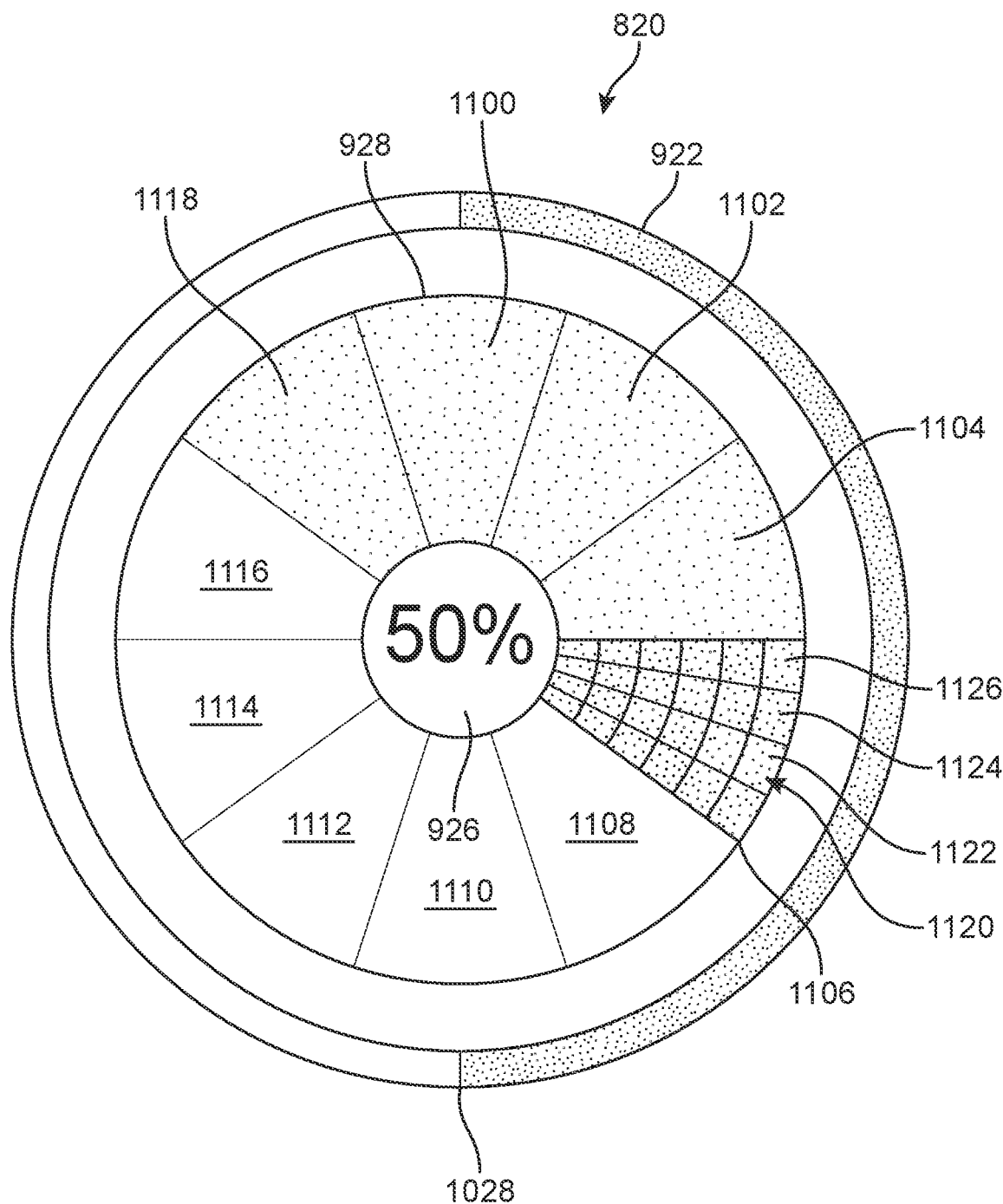
FIG. 11 is a representative view of an example embodiment of a progress indicator for a user of the interactive knowledge exploration system.

In some embodiments, a user may visually or graphically perceive their advancement through the subject matter of an exploration space, for example, first exploration space 708, including one or more subjects and/or data blocks associated with each subject within the exploration space using progress indicator 820, as described above. FIG. 11 is a representative view of an example embodiment of progress indicator 820 for a user of interactive knowledge exploration system 100. In this embodiment, progress indicator 820 includes outer completion ring 922, numerical completion indicator 926, and subject slice gauge 928, described above. Progress indicator 820 visually indicates to the user overall completion of the exploration space using pointer 1028 at a location on outer completion ring 922 that corresponds to the relative completion of all subjects in a given exploration space (e.g., pointer 1028 indicates the user's completion of first exploration space 708 shown in FIG. 10). The numerical percentage of the relative completion of all subjects in the exploration space is shown using numerical completion indicator 926 (e.g., 50% completion of first exploration space 708 as shown on progress indicator 820 in FIG. 10). Additionally, completion or progress through each subject of the one or more subjects of the exploration space may be indicated by subject slice gauge 928.

In this embodiment, subject slice gauge 928 is divided into a number of portions or wedges that each represent a different subject within the exploration space. For example, in this embodiment, for first exploration space 708 there may be a total of ten distinct subjects, each of which is represented by a portion or wedge of subject slice gauge 928. The number of subjects in an exploration space may be determined by system 100 using the data collection for the exploration space stored in exploration space database 116, described above. As shown in FIG. 11, subject slice gauge 928 includes a first wedge 1100, a second wedge 1102, a third wedge 1104, a fourth wedge 1106, a fifth wedge 1108, a sixth wedge 1110, a seventh wedge 1112, an eighth wedge 1114, a ninth wedge 1116, and a tenth wedge 1118.

In an example embodiment, as the user explores each of the subjects included in subject slice gauge 928, the corresponding wedge for that subject will change color or opacity to indicate to the user that the subject has been partially or completely explored by the user. As shown in FIG. 11, the user has at least partially explored five of the ten total subjects of first exploration space 708 during one or more discovery sessions. For example, first wedge 1100, second wedge 1102, third wedge 1104, fourth wedge 1106, and tenth wedge 1118 are shown with a different color or opacity from the remaining wedges (e.g., fifth wedge 1108, sixth wedge 1110, seventh wedge 1112, eighth wedge 1114, and ninth wedge 1116). With this arrangement, the user may visualize their progress through all of the subjects included in the exploration space (e.g. 50% completion of first exploration space 708 as shown in FIG. 11). By providing different or contrasting colors or opacities to each wedge of subject slice gauge 928 that represents subjects that have been explored by the user and other subjects that have not yet been explored by the user, the user may direct their progress towards completion of all the subjects in a given exploration space.

As described above, a wedge may represent partial or complete exploration of a given subject represented by that wedge. In an example embodiment, a wedge may include a plurality of data blocks associated with that subject within the exploration space. In this embodiment, fourth wedge 1106 is a representative wedge associated with a subject that includes a plurality of data blocks 1120. The plurality of data blocks 1120 associated with a given subject represented by the wedge (e.g., fourth wedge 1106 shown in FIG. 11) may be determined by system 100 based on the data collection for the exploration space stored in exploration space database 116, described above. For example, as shown in FIG. 11, plurality of data blocks 1120 associated with the subject represented by fourth wedge 1106 includes at least a first block 1122, a second block 1124, a third block 1126, as well as any number of additional data blocks. In some cases, a subject may be associated with any number of data blocks. In one embodiment, a subject may be associated with between 20-100 data blocks, which may be visually represented by plurality of data blocks 1120 shown in fourth wedge 1106. In other embodiments, a subject may be associated with a larger or smaller number of data blocks.

As the user explores each of these data blocks within a given subject, the color or opacity of the wedge representing that given subject may change color or opacity. In some embodiments, progress indicator 820 may visually distinguish between unexplored subjects (i.e., for which the user has not explored any data blocks associated with the subject), partially explored subjects (i.e., for which the user has explored some, but not all, of the data blocks associated with the subject), and completed subjects (i.e., for which the user has explored all of the data blocks associated with the subject). In an example embodiment, progress indicator 820 may visually distinguish these varying levels of completion using different colors and/or opacities of wedges 1100-1118. For example, as shown in FIG. 11, fifth wedge 1108, sixth wedge 1110, seventh wedge 1112, eighth wedge 1114, and ninth wedge 1116 are shown with a first color or opacity (e.g., blank) to represent unexplored subjects, first wedge 1100, second wedge 1102, third wedge 1104, and tenth wedge 1118 are shown with a second color or opacity (e.g., light stipple) to represent partially explored subjects, and fourth wedge 1106 is shown with a third color or opacity (e.g., dark stipple) to represent completed subjects.

In some embodiments, a user may see which data blocks associated with each subject have been explored or not explored by clicking or selecting a wedge corresponding to a subject. For example, a user may select first wedge 1100 and see which of the data blocks associated with the subject that corresponds to data blocks associated with each subject have already been explored and which data blocks have not yet been explored. With this arrangement, a user may determine the information associated with each subject that is needed to be explored before that subject may be considered fully explored and shown with the corresponding visual representation in progress indicator 820.

A user may have a cumulative progress score that reflects completion of subjects in one or more exploration spaces. In some embodiments, additional points may be added to user's progress score based on other activity by the user, including, but not limited to: providing feedback to an SMG about a response or subject in an exploration space, leaving a rating for an exploration space or SMG, initiating a predetermined number and/or frequency of discovery sessions, exploring a predetermined number of different exploration spaces or SMG home bases, as well as other activities or criteria that may be determined by system 100 and/or an SMG. For example, an SMG may award a user a certain number of progress points based on a comment or query that the SMG finds useful or insightful. With this arrangement, returning or frequent users of system 100 may attain progress scores that reflect their continued use of system 100.

Figure 12:
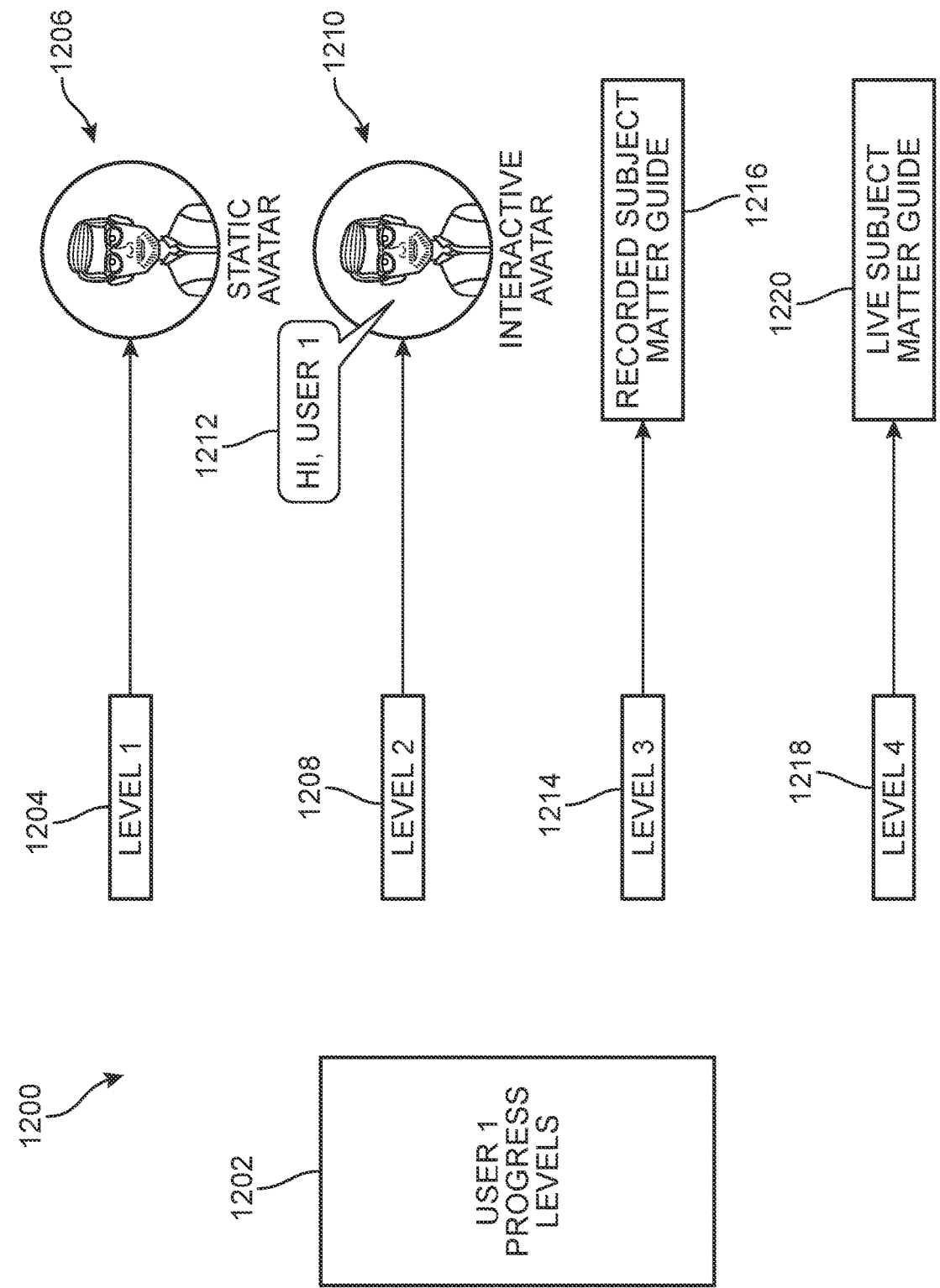
FIG. 12 is a schematic view of different levels of progress for a user of the interactive knowledge exploration system.

Referring now to FIG. 12, a schematic view of different levels of progress for a user of interactive knowledge exploration system 100 is shown. In some embodiments, users who attain a cumulative progress score that meets various threshold values may be rewarded in some manner. In an example embodiment, a user's progress score may allow the user to attain various progress levels within system 100 that provide different benefits or access to exploration spaces and/or SMGs. In this embodiment, a user's progress 1200 within system 100 may be determined according to one or more progress levels 1202.

As shown in FIG. 12, progress levels 1202 include a first level 1204 associated with a first benefit or access 1206. For example, first benefit or access 1206 may permit the user to interact with a static avatar of an SMG in the exploration spaces of system 100. Progress levels 1202 may also include a second level 1208 associated with a second benefit or access 1210. For example, second benefit or access 1210 may permit the user to interact with an interactive avatar 1212 of an SMG in the exploration spaces of system 100. Progress levels 1202 may further include a third level 1214 associated with a third benefit or access 1216. For example, third benefit or access 1216 may permit the user to interact with a recorded audio and/or video of an actual SMG (e.g., in contrast to the avatars of the SMG associated with benefits of first level 1204 and/or second level 1208) in the exploration spaces of system 100. In this embodiment, progress levels 1202 also include a fourth level 1218 associated with a fourth benefit or access 1220. For example, fourth benefit or access 1220 may permit the user to interact with a live SMG in the exploration spaces of system 100.

In different embodiments, progress levels 1202 associated with a user may include a larger or smaller number of levels with associated benefits or access. Similarly, the examples of the types of benefits or access associated with each of first level 1204, second level 1208, third level 1214, and/or fourth level 1218 shown in FIG. 12 are exemplary and other types or forms of benefits or access may be provided at different levels according to a user's overall progress 1200 in system 100. With this arrangement, system 100 may provide rewards or incentives to users of system 100 to continue to explore various SMGs and/or exploration spaces.

In addition, SMGs of interactive knowledge exploration system 100 may also be associated with progress levels. In some embodiments, SMGs may have a cumulative progress score that receives points based on various activities or actions that provide incentives to the SMGs to add new exploration spaces, add new subjects to existing exploration spaces, update subjects or responses that have low user ratings or feedback, or perform other incentivized actions within system 100. For example, an SMG may receive points towards their progress score based on a number of user visits to exploration spaces, an amount of time spent by users exploring an exploration space, user feedback, user ratings, etc. Based on the cumulate progress score of the SMG, various benefits or rewards may be provided, such as higher rankings in search results, promotion of the SMG and/or exploration space(s) of the SMG on knowledge portal 120, additional capabilities or functionalities, premium placement of the SMG or exploration space within system 100, or other monetary or non-monetary benefits or rewards.

Figure 13:
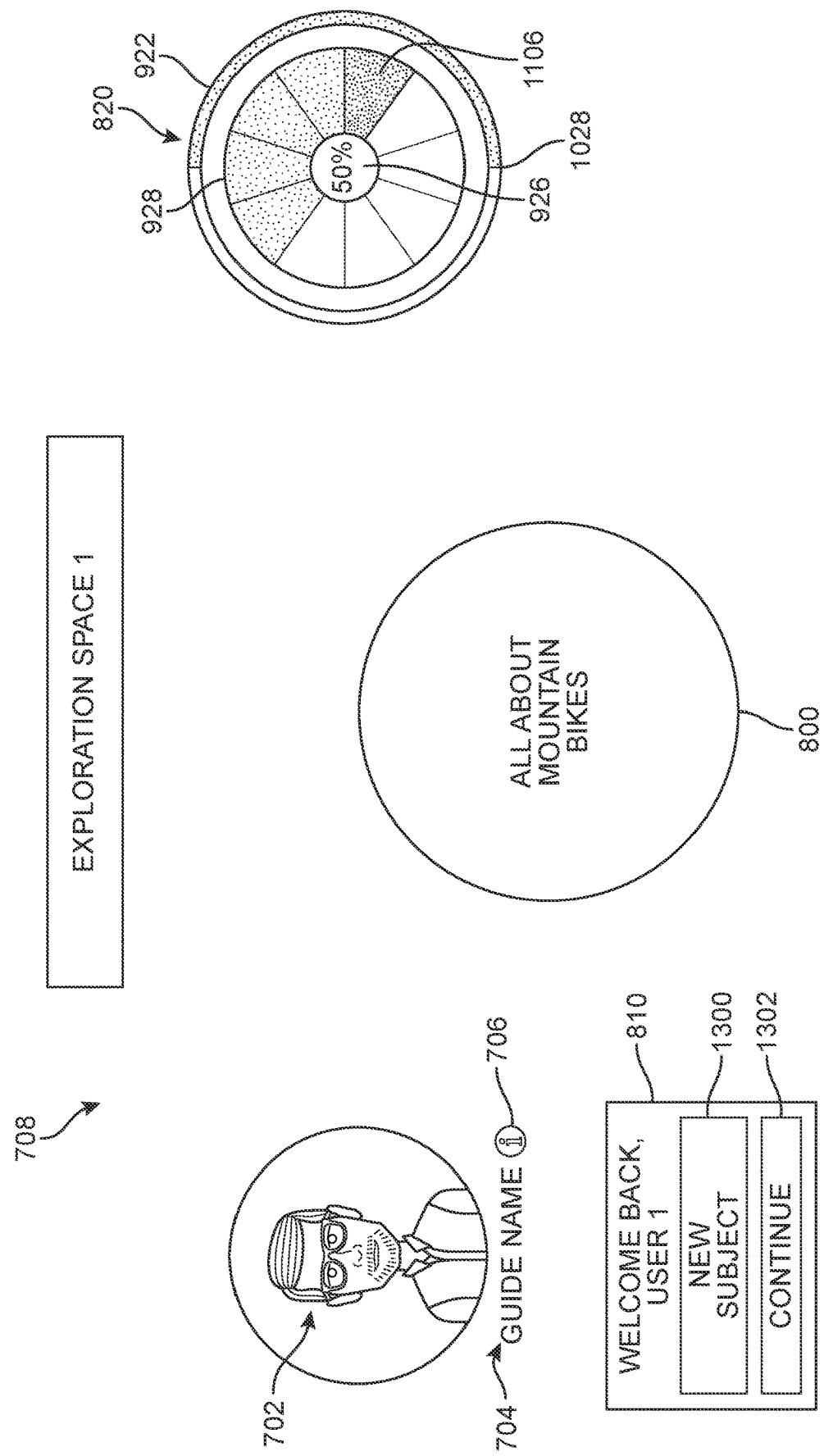
FIG. 13 is a representative view of an example embodiment of a user returning to a previous exploration space.

In some embodiments, after a user has completed a discovery session in an exploration space, that user may return to the same exploration space to continue exploring to advance their progress from the previous discovery session in one or more new discovery sessions in the same exploration space. Referring now to FIG. 13, a representative view of an example embodiment of a user returning to a previous exploration space is shown. In this embodiment, a user has returned to first exploration space 708 after having finished or terminated prior discovery session 900 shown in FIGS. 9 and 10. In an example embodiment, system 100 saves or stores the progress made by the user in first exploration space 708 during previous discovery sessions, including first discovery session 900. For example, system 100 may save the user's progress in first exploration space 708 in first data set 406 for first user 202 stored in first user file 400 in user database 118, described above. In one embodiment, the user's progress may be saved as part of interaction data 416 in first data set 406 in first user file 400. Accordingly, when the user returns to first exploration space 708, progress indicator 820 retains the user's progress through the subjects of first exploration space 708 based on the user's information stored in their user file in user database 118 of system 100.

Upon returning to a previously-explored exploration space (e.g., first exploration space 708), the user may be presented with one or more options for initiating a new discovery session. As shown in FIG. 13, query area 810 recognizes that the user is returning to first exploration space 708 and provides a first option 1300 to the user to explore a new subject and a second option 1302 to continue to explore the previous subject the user was exploring during the prior discovery session. When the user selects first option 1300, a new discovery session is initiated and the user may be presented with a choice of the available subjects in first exploration space 708. When the user selects second option 1300, a new discovery session is initiated and the user may be presented with a choice of topics associated with the previous subject the user was exploring during the prior discovery session in first exploration space 708. With this arrangement, a user may continue exploring subjects in an exploration space or may explore new subjects within the exploration space.

Figure 14:
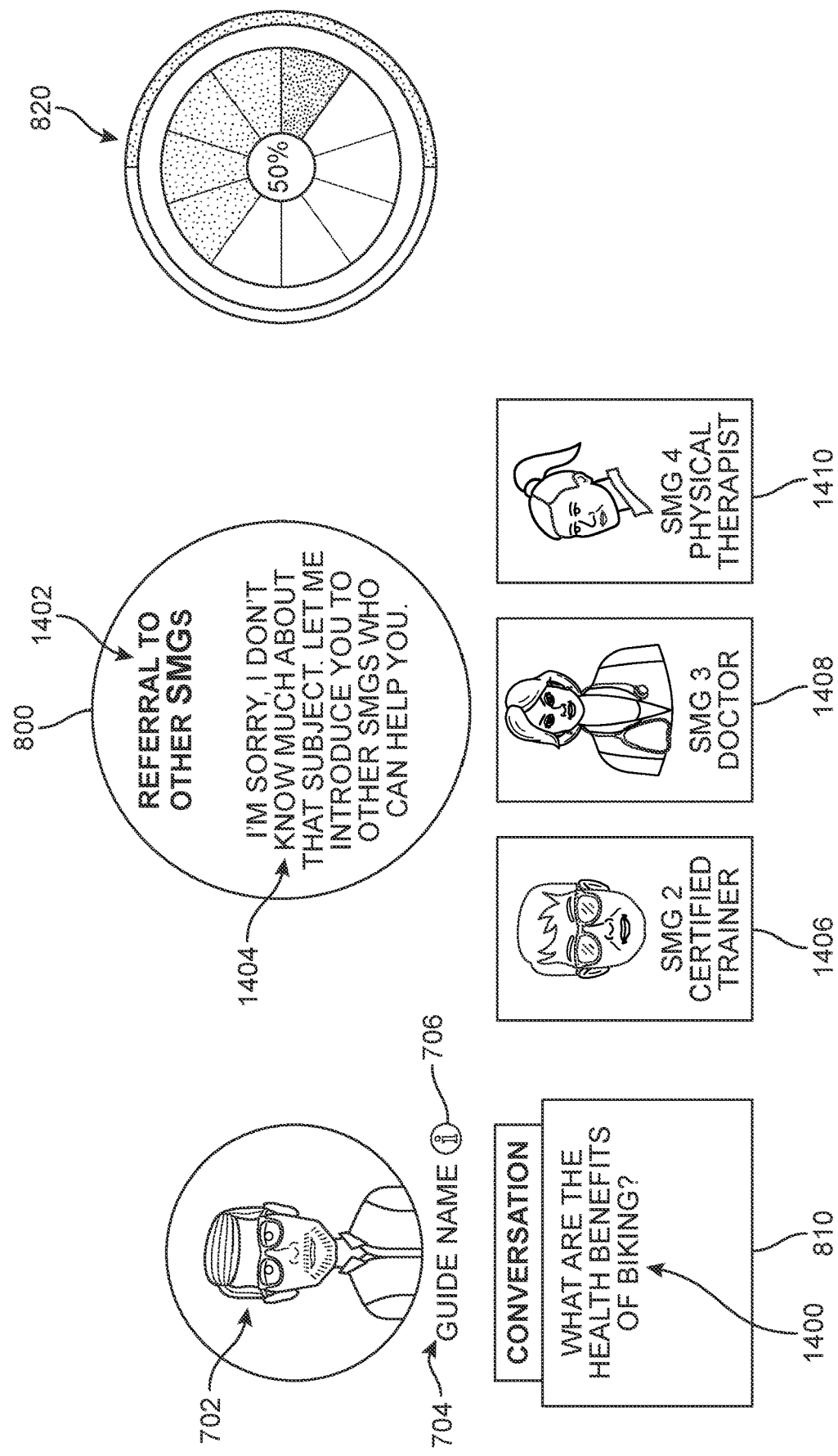
FIG. 14 is a representative view of an example embodiment of a subject matter guide avatar providing referrals to other subject matter guides in response to a user query.

In some embodiments, a user may provide a query for which the SMG does not have any or enough data or information in the data collection associated with the exploration space to provide a response. In such cases, system 100 may generate and provide one or more referrals to another SMG and/or a different exploration space that may be relevant to the user's query. Referring now to FIG. 14, a representative view of an example embodiment of a subject matter guide avatar providing referrals to other subject matter guides in response to a user query is shown.

In this embodiment, a user has entered query 1400 into query area 810 for SMG 704 (e.g., "What are the health benefits of biking?"). In this example, the data or information in the data collection for the exploration space of SMG 704 does not have any or enough data or information to provide a response to query 1400. In response, system 100 may display in response area 800 a message 1402 to the user that the SMG cannot answer query 1400 and may include a referral 1404 to the user to home bases of one or more different SMGs that may have exploration spaces relevant to query 1400. For example, in some cases, SMG 704 may have pre-selected one or more other SMGs that may be used to provide a referral to answer the user's query. In other cases, system 100 may analyze query 1400 to determine keywords or subjects and determine if data or information associated with data collections for exploration spaces from other SMGs stored in exploration space database 116 have a match to the keywords or subjects associated with query 1400 to provide a referral to an SMG that has an exploration space to answer the user's query.

As shown in FIG. 14, referral 1404 includes links or connections to home bases and/or exploration spaces of other SMGs that may be relevant to query 1400. In this embodiment, in response to query 1400 about the health benefits of biking, system 100 may provide a link or connection to a home base or exploration space of a second SMG 1406 who is a certified trainer, a third SMG 1408 who is a doctor, and/or a fourth SMG 1410 who is a physical therapist. The user may then navigate to one or more home bases or exploration spaces for second SMG 1406, third SMG 1408, and/or fourth SMG 1410 to obtain a response to query 1400.

Figure 15:
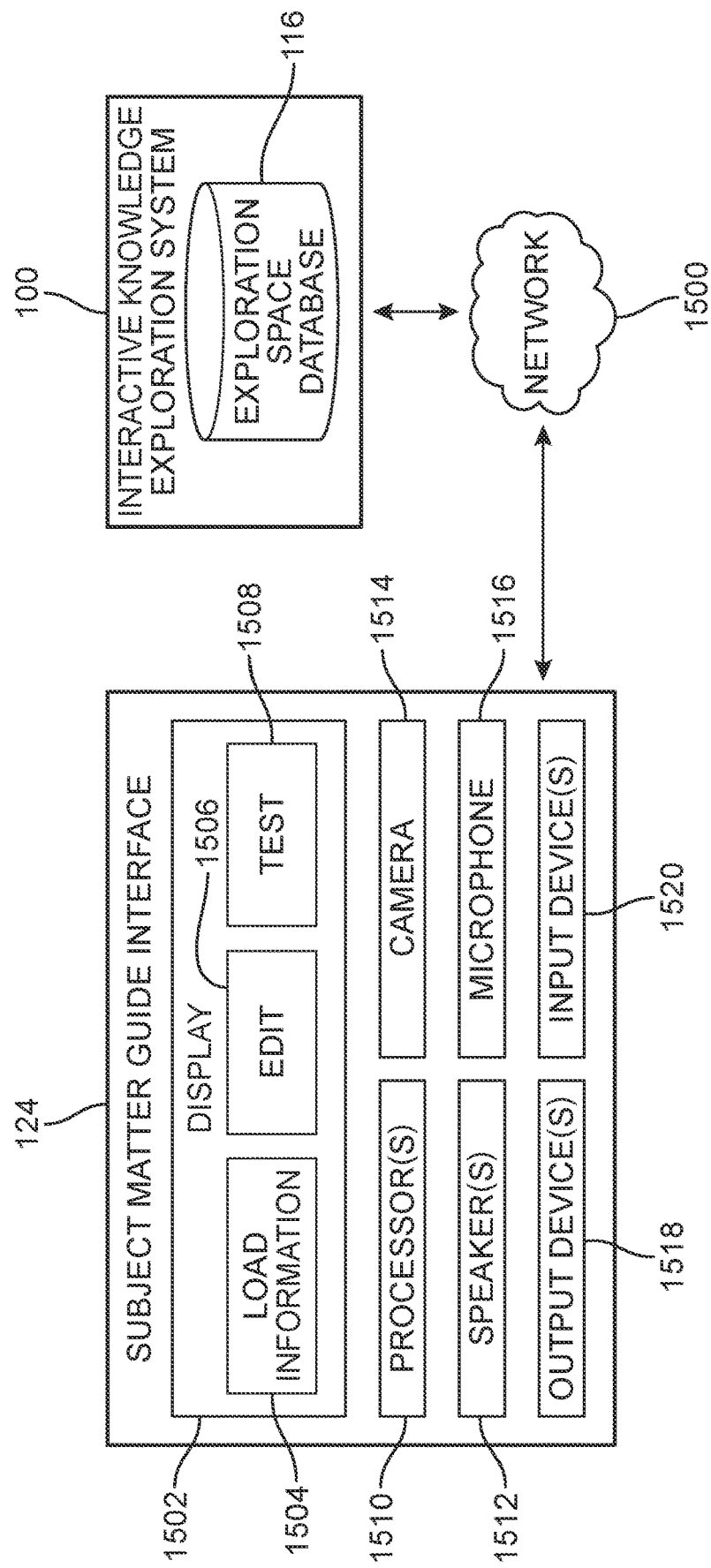
FIG. 15 is a representative view of an example embodiment of a subject matter guide interface.

FIG. 15 is a representative view of an example embodiment of a subject matter guide interface 124 that allows an SMG to interact with system 100. In some embodiments, subject matter guide interface 124 provides a mechanism that allows an SMG of system 100 to interact with or engage with components of system 100, including exploration space database 116. In one embodiment, subject matter guide interface 124 may be an application or software program that runs or executes on a computing device of the SMG and allows the SMG to create, curate, edit, modify, and publish exploration spaces on system 100.

In an example embodiment, subject matter guide interface 124 may include at least one processor 1510 and a display 1502. Display 1502 may be used to display various information and command options to the SMG, including a load information option 1504, an edit option 1506, and/or a test option 1508. An SMG may use load information option 1504, edit option 1506, and/or test option 1508 to create, curate, edit, modify, and publish exploration spaces on system 100. In an example embodiment, load information option 1504 allows an SMG to upload or transmit data and information to system 100 that is used for creating an exploration space. For example, load information option 1504 may permit the SMG to create, add, or replace data and information stored in the data collection for the SMG, including data and information associated with one or more exploration spaces associated with the SMG (e.g., first data collection 306 associated with first SMG 300 stored in exploration space database 116 shown in FIG. 3). In an example embodiment, load information option 1504 allows the SMG to "drag-and-drop" data to automatically upload to the data collection for the SMG stored in exploration space database 116.

In an example embodiment, edit option 1506 permits the SMG to curate, edit, and/or modify data or information for an exploration space, including grouping of subjects and association of data blocks for each subject, as will be described in more detail with reference to FIGS. 16 and 17. In an example embodiment, test option 1508 permits the SMG to conduct one or more test discovery sessions in an exploration space to assess the accuracy and functionality of the exploration space, for example, to submit test queries and analyze the offered responses, as will be described in more detail with reference to FIG. 18. The SMG may use test option 1508 to determine if the exploration space is ready to be published and to publish the exploration space so that it is available to users of system 100.

Subject matter guide interface 124 may also include one or more speakers 1512 that are configured to output audio to the SMG from system 100 and/or the users of system 100. In some embodiments, subject matter guide interface 124 may also include components that allows the SMG to send or transmit audio and/or video to system 100, such as, for example, a camera 1514 configured to capture or record video and/or image information from the SMG and a microphone 1516 configured to capture or record audio information from the SMG. In an example embodiment, system 100 may use inputs from an SMG captured by one or more of camera 1514 and/or microphone 1516 of subject matter guide interface 124 to input data or information into exploration space database 116. For example, camera 1514 and/or microphone 1516 of subject matter guide interface 124 may capture one or more of gestures, facial expressions, or body language of a user that may then be used by AI engine 102 and/or GUI rendering module 112 of system 100 to generate and/or control a static or interactive avatar of the SMG to the user in an exploration space of the SMG.

In some embodiments, subject matter guide interface 124 may also include one or more other input devices 1518 and/or one or more other output devices 1520. In different embodiments, subject matter guide interface 124 may take any one or more of a variety of different forms or devices. For example, as shown in FIG. 15, subject matter guide interface 124 may be embodied in a computer on which the SMG may engage with system 100 through a network 1500. Subject matter guide interface 124 may also be embodied in a mobile device, such as a smartphone or tablet computer, on which the SMG may engage with system 100 through network 1500. It should be understood that the examples of subject matter guide interface 124, including a computer or mobile device, are not limiting and other devices or forms of subject matter guide interface 124 may be provided to interact with system 100.

In some embodiments, subject matter guide interface 124 may include a news feed or similar type of information presentation to the SMG that provides the SMG with various information and/or functionalities associated with interactive knowledge exploration system 100. For example, the news feed feature of subject matter guide interface 124 may list information about the SMG's exploration spaces and/or users that have visited the exploration spaces, including user comments, ratings, and/or feedback, queries from users that required a referral to another SMG and/or exploration space, other SMGs and/or exploration spaces that are being followed by the SMG, activity of any users that are being followed by the SMG, and other functions, such as analytics or account information. In some embodiments, the news feed of subject matter guide interface 124 may be the default view that an SMG is presented with upon interacting with interactive knowledge exploration system 100.

Figure 16:
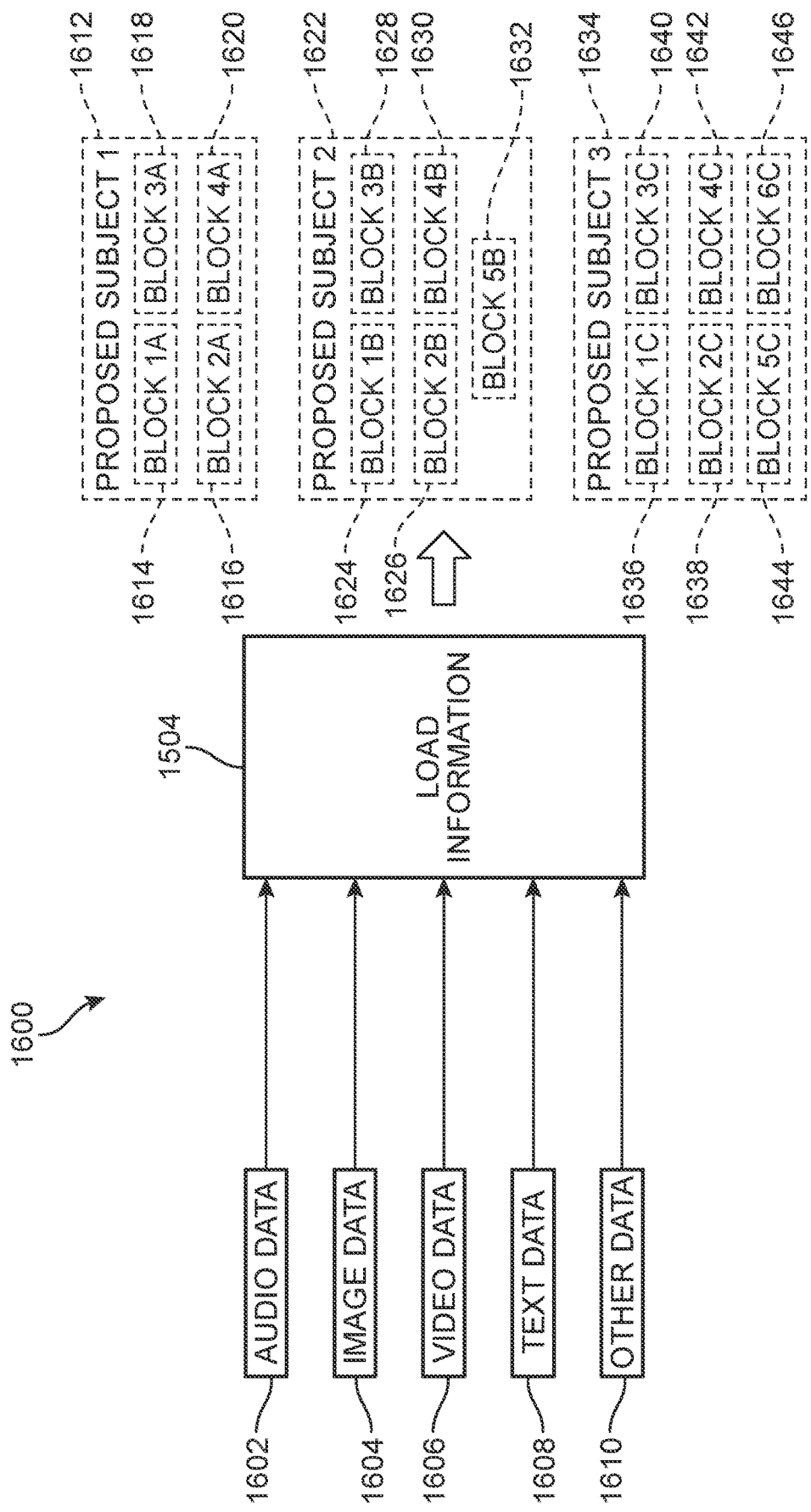
FIG. 16 is a schematic view of an example embodiment of a process for processing loaded data from a subject matter guide to generate a plurality of proposed subjects with associated information blocks.

Referring now to FIG. 16, a schematic view of an example embodiment of a process 1600 for processing and parsing loaded data from a subject matter guide to generate a plurality of proposed subjects with associated information blocks is shown. In an example embodiment, process 1600 may be used by system 100 to load, sort, and preliminarily group data or information provided by an SMG into a data collection associated with that SMG for an exploration space. In this embodiment, process 1600 may be initiated by the SMG using load information option 1504 through subject matter guide interface 124.

In this embodiment, a representative data collection for an SMG is shown in detail, for example, first data collection 306 associated with first SMG 300 shown in FIG. 3. In an example embodiment, each data collection of plurality of data collections stored in exploration space database 116 may include various types and formats of data or information provided by an SMG for creating one or more exploration spaces. As shown in FIG. 16, the data provided by the SMG as part of process 1600 may include audio data 1602, image data 1604, video data 1606, text data 1608, and/or other data 1610 associated with one or more subjects of an exploration space to be stored in exploration space database 116.

Audio data 1602 can include one or more voice files or recordings of the SMG speaking or reading so that AI engine 102 and/or GUI rendering module 112 of system 100 may use audio data 1602 to provide recordings of the SMG to users and/or to accurately mimic the speech, voice inflections, and manner of speaking of the SMG for a static or interactive avatar. For example, audio data 1602 may include archived speeches by the SMG, recorded audio messages, songs, or readings by the SMG. Additionally, audio data 1602 may also include audio files of the SMG obtained from video data 1606.

Image data 1604 can include one or more image files or photographs of the SMG so that AI engine 102 and/or GUI rendering module 112 of system 100 may use image data 1604 to accurately render and generate the physical characteristics of at least the face/head or the partial or full body of the SMG from a variety of different angles and perspectives for a static or animated avatar of the SMG. AI engine 102 may use GUI rendering module 112 of system 100 to generate a three-dimensional representation of the SMG from the plurality of two-dimensional representations of the SMG from image data 1604. Additionally, image data 1604 may also include one or more frames of the SMG obtained from video data 1606.

Video data 1606 can include one or more video files or recordings of the SMG so that AI engine 102 and/or GUI rendering module 112 of system 100 may use video data 1606 to provide videos of the SMG to users and/or to accurately mimic facial expressions, hand movements, body posture, and other physical mannerisms of the SMG for a static or interactive avatar. For example, video data 1606 may include short or long clips or movies of the SMG, including professional or home movies, as well as other video recordings from security cameras or motion capture devices.

Text data 1608 can include one or more text files or data written, typed, or otherwise generated by the SMG. For example, text data 1608 may include publications, letters, emails, text messages, books, presentations, social media posts or comments, product or service reviews, or any other format of text written or generated by the SMG.

Other data 1610 can include various additional or supplemental information that is related or connected to information in an exploration space. In some embodiments, other data 1610 can include the additional or supplemental information provided in supplemental information box 930 described above. For example, other data 1610 can include videos, reviews, specifications, and/or locations to buy products or services. Other data 1610 may also include links or connections to third party servers or databases where the additional or supplemental information that is related or connected to information in an exploration space may be obtained. For example, a link or connection to a video sharing website where reviews may be found or a link or connection to a product manufacturer's website may be stored in other data 1610.

In addition, audio data 1602, image data 1604, video data 1606, text data 1608, and/or other data 1610 associated with the exploration space stored in exploration space database 116 may include dates, time stamps, or other identifiers of time that allow the SMG and/or system 100 to identify a time period when the associated data was generated, stored, edited, and/or modified.

As part of process 1600, when the SMG uses load information option 1504 to upload or transmit audio data 1602, image data 1604, video data 1606, text data 1608, and/or other data 1610 associated with the exploration space to exploration space database 116 of system 100, AI engine 102 of system 100 may process and parse the provided data or information. As shown in FIG. 16, AI engine 102 has processed and parsed audio data 1602, image data 1604, video data 1606, text data 1608, and/or other data 1610 into a plurality of proposed subjects that are preliminarily grouped by system 100 based on relevancy and similarity of the data in each proposed subject.

As shown in FIG. 16, the plurality of proposed subjects preliminarily grouped by system 100 include a first proposed subject 1612 including a plurality of data or information blocks determined by system 100 to be related or associated with first proposed subject 1612. In this embodiment, first proposed subject 1612 includes a data block 1A 1614, a data block 2A 1616, a data block 3A 1618, and a data block 4A 1620. In this example, the plurality of proposed subjects preliminarily grouped by system 100 also include a second proposed subject 1622 including a data block 1B 1624, a data block 2B 1626, a data block 3B 1628, a data block 4B 1630, and a data block 5B 1632 that have been determined by system 100 to be related or associated with second proposed subject 1622. The plurality of proposed subjects preliminarily grouped by system 100 further include a third proposed subject 1634 including a data block 1C 1636, a data block 2C 1638, a data block 3C 1640, a data block 4C 1642, aa data block 5C 1644, and a data block 6C 1646 that have been determined by system 100 to be related or associated with third proposed subject 1634.

In this embodiment, as part of process 1600, system 100 has processed and parsed audio data 1602, image data 1604, video data 1606, text data 1608, and/or other data 1610 into a plurality of proposed subjects that are preliminarily grouped by system 100 into first proposed subject 1612, second proposed subject 1622, and third proposed subject 1634 with associated data blocks. It should be understood that a data collection may include any number of proposed subjects, each with any number of associated data or information blocks.

Figure 17:
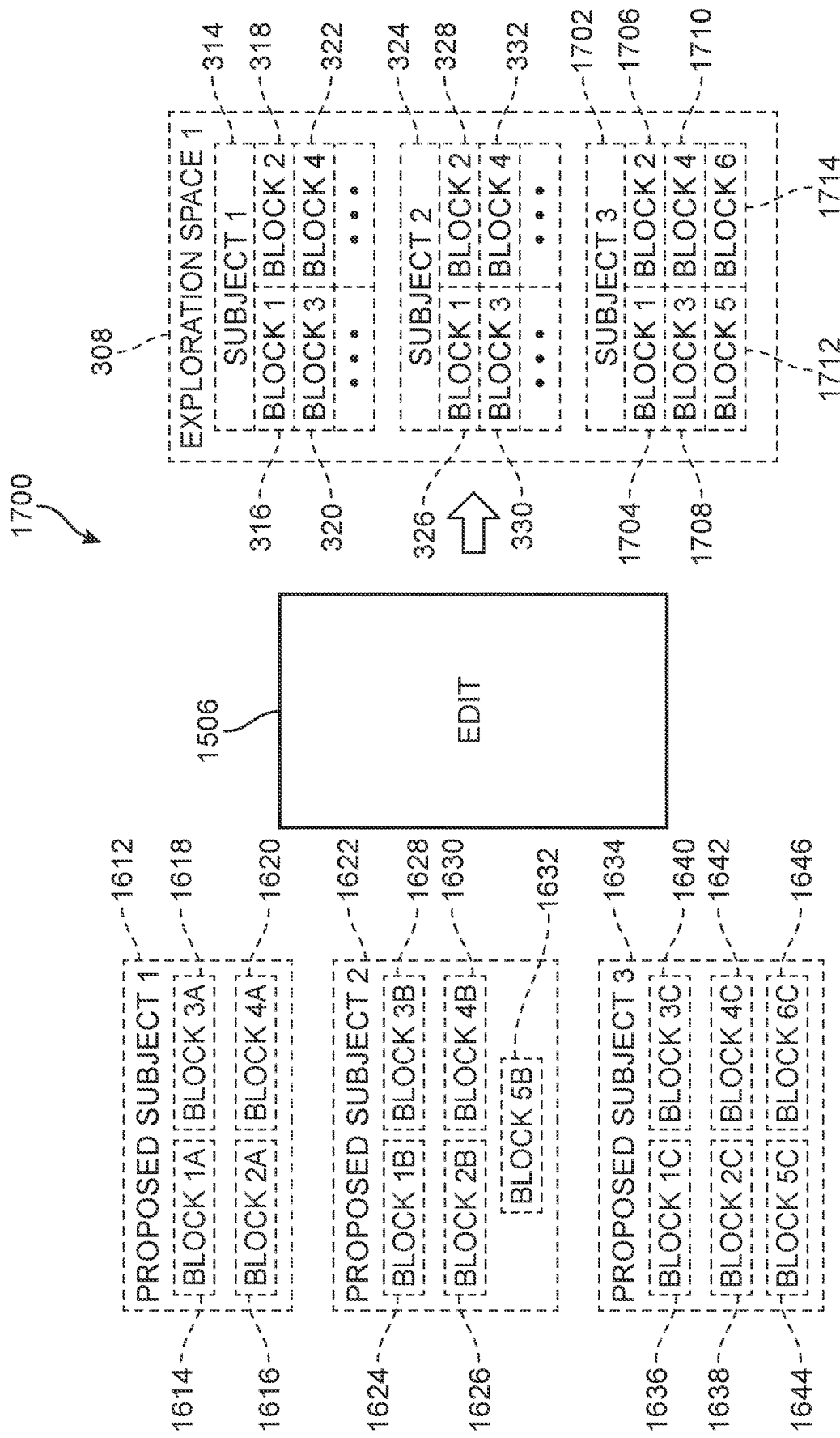
FIG. 17 is a schematic view of an example embodiment of a process for editing subjects and information blocks to create an exploration space.

FIG. 17 is a schematic view of an example embodiment of a process 1700 for editing the proposed subjects and data or information blocks to create an exploration space. In an example embodiment, process 1700 may be used by an SMG to edit, add, delete, rearrange, and/or modify the preliminarily grouped data or information initially generated by system 100 (e.g., as part of process 1600, described above). In this embodiment, process 1700 may be initiated by the SMG using edit option 1506 through subject matter guide interface 124. As shown in FIG. 17, the plurality of proposed subjects that were preliminarily grouped by system 100 into first proposed subject 1612, second proposed subject 1622, and third proposed subject 1634 with associated data blocks may be edited, added, deleted, rearranged, and/or modified by the SMG using edit option 1506 to generate first exploration space 308.

In this embodiment, the SMG has edited first proposed subject 1612, second proposed subject 1622, and third proposed 1634 to first subject 314, second subject 324, and a third subject 1702 that form the data and information for first exploration space 308. First subject 314 includes a plurality of data blocks, including first block 316, second block 318, third block 320, and fourth block 322 and second subject 324 that includes a plurality of data blocks, including first block 326, second block 328, third block 330, and fourth block 332. Additionally, third subject 1702 includes a first block 1704, a second block 1706, a third block 1708, a fourth block 1710, a fifth block 1712, and a sixth block 1714.

In this embodiment, process 1700 has resulted in first proposed subject 1612 being edited by the SMG to generate first subject 314, second proposed subject 1622 has had at least one data block deleted or removed to generate second subject 324, and third proposed subject 1634 has had one or more of data blocks 1636-1646 rearranged or replaced to generate third subject 1702 with data blocks 1704-1714 that include at least one data block that is different from the data blocks of third proposed subject 1634. Together, the combined subjects and associated data blocks from process 1700 may be used to create or generate first exploration space 308 that is stored in exploration space database 116 With this arrangement, an SMG using process 1700 may revise or change the preliminarily grouped subjects and data blocks initially generated by system 100 to reflect the selected content for the exploration space.

Figure 18:
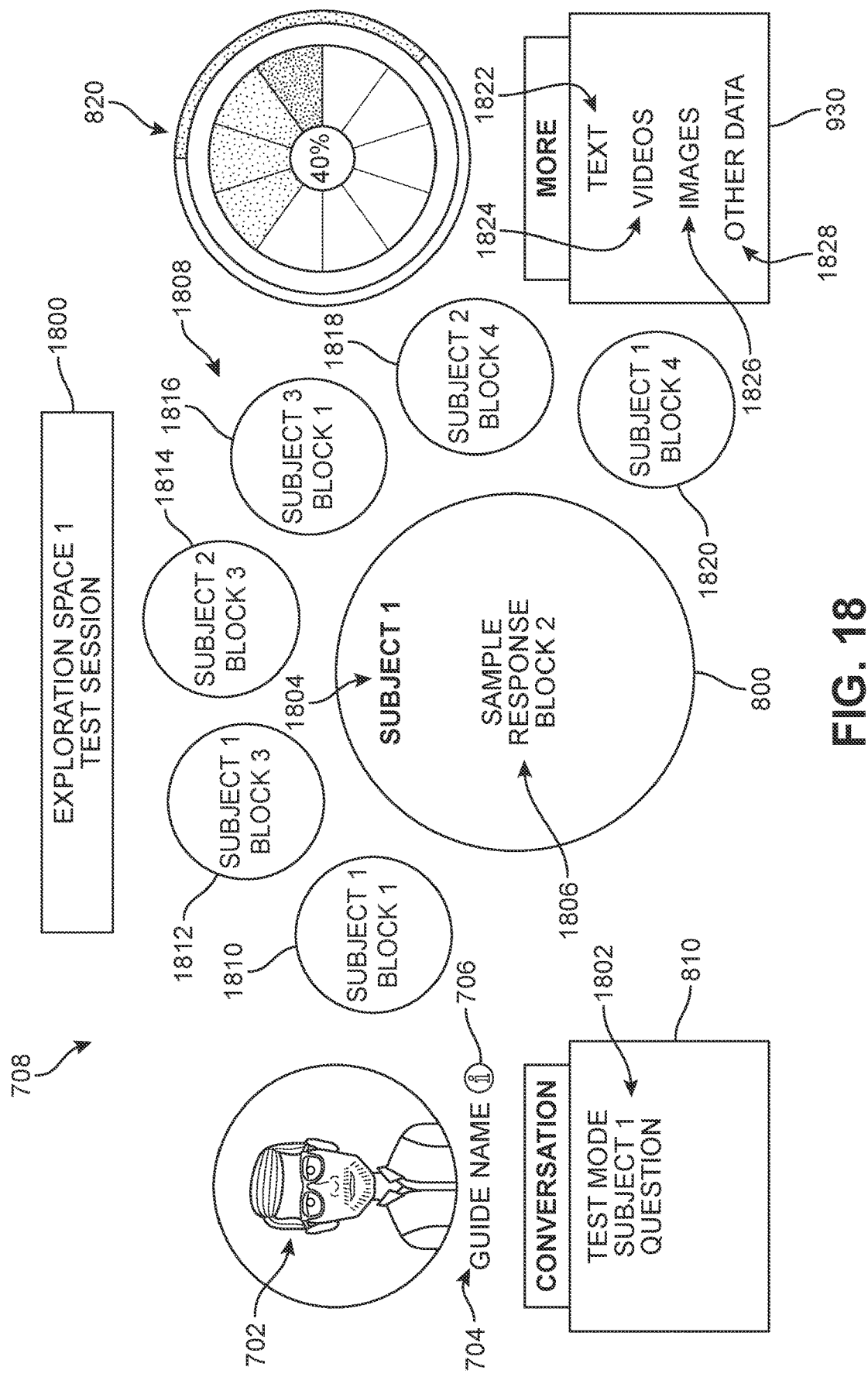
FIG. 18 is a schematic view of an example embodiment of a test mode for a discovery session of an exploration space.

Referring now to FIG. 18, a schematic view of an example embodiment of a test mode for a discovery session of an exploration space. Once an SMG has completed any edits as part of process 1700 described above, the SMG may initiate a test discovery session for the exploration space, for example, by using test option 1508 through subject matter guide interface 124. In this embodiment, a test discovery session 1800 for first exploration space 708 associated with SMG 704 is shown. In an example embodiment, SMG 704 may enter one or more sample queries into query area 810 of first exploration space 708 to evaluate the responses to the sample queries generated by system 100 using the data and information stored in exploration space database 116 (e.g., the data and information associated with first exploration space 308, including first subject 314, second subject 324, and a third subject 1702 and their associated data blocks).

For example, as shown in FIG. 18, during test discovery session 1800, SMG 704 enters a sample query 1802 into query area 810 of first exploration space 708 and a sample response 1804 with sample detailed answer 1806 is shown in response area 800 of first exploration space 708. In this example, sample query 1802 relates to a first subject and sample response 1804 shown in response area 800 relates to the same first subject. Sample detailed answer 1806 shown in response area 800 includes data or information associated with data block 2 of the first subject (e.g., second block 318 of first subject 314) that is the source of sample detailed answer 1806. Using test discovery session 1800, SMG 704 may evaluate and analyze the correctness or accuracy of sample answer 1804 and/or sample detailed answer 1806 in response to sample query 1802.

Additionally, during test discovery session 1800, a plurality of potentially relevant responses 1808 are shown displayed around an outer perimeter of response area 800. For example, as shown in FIG. 18, plurality of potentially relevant responses 1808 include a first potentially relevant response 1810, a second potentially relevant response 1812, a third potentially relevant response 1814, a fourth potentially relevant response 1816, a fifth potentially relevant response 1818, and a sixth potentially relevant response 1820. Each potentially relevant response of plurality of potentially relevant responses 1808 identifies the relevant subject and data block from the data and information stored in exploration space database 116 (e.g., first exploration space 308) that is the source of the potentially relevant response generated by system 100 based on sample query 1802. With this arrangement, SMG 704 may evaluate and analyze the correctness or accuracy of plurality of potentially relevant responses 1808 in response to sample query 1802.

Similarly, additional or supplemental information included in supplemental information box 930 that relates to sample answer 1804 and/or sample detailed answer 1806, including supplemental text 1822, videos 1824, images 1826, or other data 1828 may be evaluated by SMG 704 during test discovery session 1800 of first exploration space 708. In some embodiments, based on the evaluation and/or analysis of first exploration space 708 during test discovery session 1800, the SMG (e.g., SMG 704) may initiate one or more edit processes (e.g., similar to process 1700, described above) using edit option 1506 to make changes to the data and information stored in exploration space database 116 (e.g., first exploration space 308) that is used by system 100 to generate first exploration space 708. Once the SMG determines that the exploration space is ready to share with users of system 100, the SMG may then publish the exploration space so that it is available to explore by users of system 100, for example, through knowledge portion 120 of system 100, shown in FIGS. 1 and 2.

Figure 19:
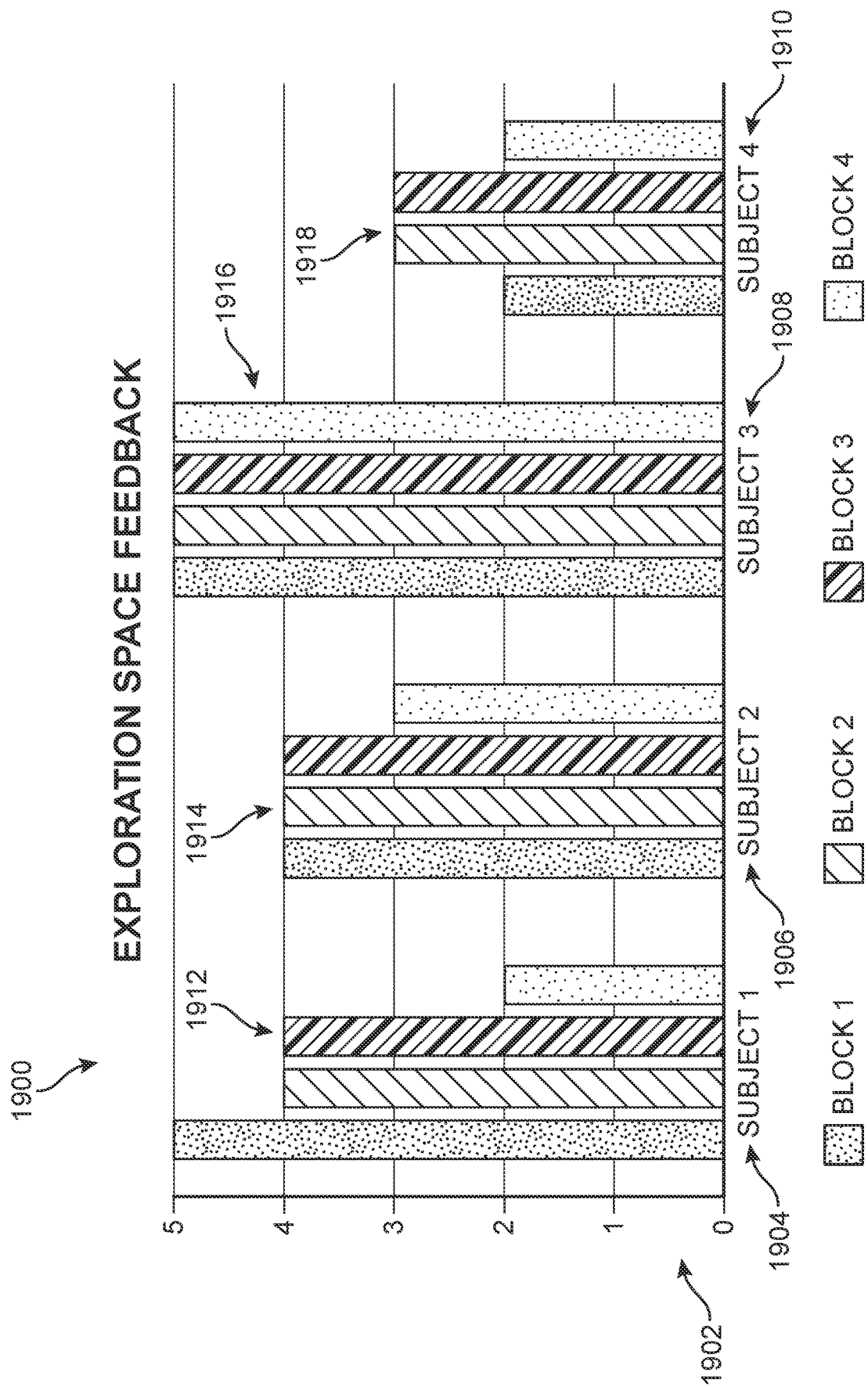
FIG. 19 is a representative view of an example embodiment of exploration space feedback generated by one or more users.

In some embodiments, in addition to conducting one or more test discovery sessions of an exploration space, an SMG may also collect and analyze feedback from users of an exploration space in order to make any further changes or modifications to the exploration space, including adding, editing, modifying, or rearranging any of the subjects and/or data blocks stored in exploration space database 116. Referring now to FIG. 19, a representative view of an example embodiment of exploration space feedback 1900 generated by one or more users of an exploration space is shown.

In this embodiment, users of an exploration space may rate their satisfaction with the accuracy, correctness, or relevancy of responses generated by system 100 to their queries. As shown in FIG. 19, users may use a scale 1902 that rates each response, identified by subject and corresponding data block, from 0 to 5, with 5 being the highest rating. It should be understood that exploration space feedback 1900 may take other forms and may use other rating systems or scales different from scale 1902 shown in FIG. 19.

In this embodiment, exploration space feedback 1900 includes ratings from users of an exploration space about a first subject 1904, a second subject 1906, a third subject 1908, and a fourth subject 1910. The individual blocks associated with each subject, which are used by system 100 to generate responses to queries from the users, are then individually rated by the users. As shown in FIG. 19, ratings 1912 for the blocks associated with first subject 1904, ratings 1914 for the blocks associated with second subject 1906, ratings 1916 for the blocks associated with third subject 1908, and ratings 1918 for the blocks associated with fourth subject 1910 are shown. Exploration space feedback 1900 may then be used by the SMG to identify responses that have been given low or poor ratings by users of the exploration space. With this feedback, the SMG may initiate one or more edit processes (e.g., similar to process 1700, described above) using edit option 1506 to make changes to the data and information stored in exploration space database 116 that is used by system 100 to generate the responses.

For example, in this embodiment, exploration space feedback 1900 indicates that data block 4 of first subject 1904 has been given lower ratings than other responses within first subject 1904 (e.g., responses associated with data block 1, data block 2, and data block 3). An SMG may edit, modify, or change the associated data or data block for first subject 1904 to provide a different or more relevant response to a user query about that aspect of first subject 1904. Additionally, exploration space feedback 1900 indicates that fourth subject 1910 is associated with ratings 1918 that are low or poor for all of the responses generated for fourth subject 1910. Based on exploration space feedback 1900, the SMG may edit, modify, or change the associated data or data blocks for fourth subject 1910 to provide a different or more relevant responses to user queries about fourth subject 1910. With this arrangement, an exploration space may change over time through exploration space feedback 1900 to improve its accuracy and relevancy to the topics or subjects of the exploration space.

In some embodiments, an SMG may add points to a user's progress score based on providing feedback to the SMG about a particular response or subject in an exploration space and/or for leaving a rating about a particular response or subject in an exploration space. With this arrangement, users may be provided with an incentive to accurately rate responses generated by system 100 to their queries in the exploration space to help improve the accuracy and/or relevance of those responses and the usefulness of the exploration space in general.

In some embodiments, feedback from users about an SMG's exploration space, for example, exploration space feedback 1900, may be automatically included in the news feed for the SMG in subject matter guide interface 124, described above. Additionally, each individual rating, comment, or feedback from users on the subjects, responses, or data contained in the exploration space may be separately listed and included in the SMG's news feed in real-time so that the SMG has dynamic feedback from users of the SMG's exploration spaces.

While various embodiments of the disclosure have been described, the description is intended to be exemplary, rather than limiting and it will be apparent to those of ordinary skill in the art that many more embodiments and implementations are possible that are within the scope of the disclosure. Accordingly, the disclosure is not to be restricted except in light of the attached claims and their equivalents. Also, various modifications and changes may be made within the scope of the attached claims.

The invention claimed is:

1. A method of generating an exploration space for a plurality of users of an interactive knowledge exploration system, the method comprising:
    providing a subject matter guide interface in communication with the interactive knowledge exploration system;
    receiving data from a subject matter guide for a data collection associated with a first exploration space, wherein the received data from the subject matter guide for the data collection is submitted through the subject matter guide interface;
    processing the received data and parsing the received data into a plurality of proposed subjects for the first exploration space, each proposed subject of the plurality of proposed subjects being associated with a plurality of data blocks associated with the proposed subject;
    receiving edits to one or more of the proposed subjects of the plurality of proposed subjects, including edits to one or more groupings of data blocks of the plurality of data blocks for the plurality of proposed subjects;
    publishing the first exploration space to make the first exploration space available to the plurality of users of the interactive knowledge exploration system;
    wherein the subject matter guide interface includes a test option; and
    wherein the test option allows the subject matter guide to generate a test discovery session in the first exploration space.

2. The method according to claim 1, further comprising:
    generating the first exploration space using information from the data collection associated with the first exploration space stored in an exploration space database of the interactive knowledge exploration system.

3. The method according to claim 2, further comprising:
    engaging in a first discovery session in the first exploration space with a first user of the plurality of users, wherein an artificial intelligence engine of the interactive knowledge exploration system uses the data collection associated with the first exploration space stored in the exploration space database to generate one or more responses to a query from the first user during the first discovery session.

4. The method according to claim 1, further comprising:
    generating the test discovery session prior to publishing the first exploration space.

5. The method according to claim 4, further comprising:
    receiving changes to the received data for the data collection based on the test discovery session.

6. The method according to claim 1, wherein the subject matter guide interface includes a load information option; and
    wherein the load information option allows the subject matter guide to submit the received data for the data collection.

7. The method according to claim 1, wherein the subject matter guide interface includes an edit option; and
    wherein the edit option allows the subject matter guide to provide edits to the one or more of the proposed subjects of the plurality of proposed subjects.

8. The method according to claim 1, further comprising:
receiving exploration space feedback from one or more users of the plurality of users who have engaged in a discovery session in the first exploration space.

9. The method according to claim 8, further comprising:
changing at least one data block associated with a subject of the plurality of subjects based on the received exploration space feedback.

10. The method according to claim 1, wherein the data collection associated with the subject matter guide stored in the exploration space database includes data or information associated with a second exploration space, the second exploration space being directed to a different topic or subject than the first exploration space.

11. An interactive knowledge exploration system, the system comprising:
an exploration space database including a data collection associated with at least one exploration space;
a subject matter guide interface allowing communication with a subject matter guide having a data collection stored in the exploration space database;
a graphic user interface (GUI) rendering module rendering and generating an exploration space from the data collection for the exploration space in the exploration space database;
an artificial intelligence engine in communication with the exploration space database, the subject matter guide interface, and the GUI rendering module, the artificial intelligence engine including at least one processor, a memory, and storage for computer-readable instructions that, when executed by the at least one processer, cause the at least one processor to:
receive data from a subject matter guide for a data collection associated with a first exploration space, wherein the received data from the subject matter guide for the data collection is submitted through the subject matter guide interface;
process the received data and parse the received data into a plurality of proposed subjects for the first exploration space, each proposed subject of the plurality of proposed subjects being associated with a plurality of data blocks associated with the proposed subject;
receive edits to one or more of the proposed subjects of the plurality of proposed subjects, including edits to one or more groupings of data blocks of the plurality of data blocks for the plurality of proposed subjects; and
publish the first exploration space to make the first exploration space available to a plurality of users of the interactive knowledge exploration system;
wherein the subject matter guide interface includes a test option; and
wherein the test option allows the subject matter guide to generate a test discovery session in the first exploration space.

12. The system according to claim 11, wherein the instructions further cause the at least one processor to:
generate the first exploration space using information from the data collection associated with the first exploration space stored in an exploration space database.

13. The system according to claim 12, wherein the instructions further cause the at least one processor to:
engage in a first discovery session in the first exploration space with a first user of the plurality of users, wherein the artificial intelligence engine of the interactive knowledge exploration system uses the data collection associated with the first exploration space stored in the exploration space database to generate one or more responses to a query from the first user during the first discovery session.

14. The system according to claim 11, wherein the instructions further cause the at least one processor to:
generate the test discovery session prior to publishing the first exploration space.

15. The system according to claim 14, wherein the instructions further cause the at least one processor to:
receive changes to the received data for the data collection based on the test discovery session.

16. The system according to claim 11, wherein the subject matter guide interface includes a load information option; and
wherein the load information option allows the subject matter guide to submit the received data for the data collection.

17. The system according to claim 11, wherein the subject matter guide interface includes an edit option; and
wherein the edit option allows the subject matter guide to provide edits to the one or more of the proposed subjects of the plurality of proposed subjects.

18. The system according to claim 11, wherein the instructions further cause the at least one processor to:
receive exploration space feedback from one or more users of the plurality of users who have engaged in a discovery session in the first exploration space.

19. The system according to claim 18, wherein the instructions further cause the at least one processor to:
change at least one data block associated with a subject of the plurality of subjects based on the received exploration space feedback.

20. The system according to claim 11, wherein the data collection associated with the subject matter guide stored in the exploration space database includes data or information associated with a second exploration space, the second exploration space being directed to a different topic or subject than the first exploration space.

* * * * *